(12) United States Patent
Uechi et al.

(10) Patent No.: US 11,459,948 B2
(45) Date of Patent: Oct. 4, 2022

(54) GAS TURBINE PLANT

(71) Applicant: MITSUBISHI HEAVY INDUSTRIES, LTD., Tokyo (JP)

(72) Inventors: Hideyuki Uechi, Tokyo (JP); Hanjoon Song, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/167,236

(22) Filed: Feb. 4, 2021

(65) Prior Publication Data
US 2021/0262383 A1 Aug. 26, 2021

(30) Foreign Application Priority Data
Feb. 26, 2020 (JP) .............................. JP2020-031078

(51) Int. Cl.
*F02C 3/06* (2006.01)
*F02C 3/30* (2006.01)
*F02C 6/04* (2006.01)
*F02C 9/40* (2006.01)

(52) U.S. Cl.
CPC ............... *F02C 3/305* (2013.01); *F02C 3/06* (2013.01); *F02C 6/04* (2013.01); *F02C 9/40* (2013.01); *F05D 2220/32* (2013.01); *F05D 2220/72* (2013.01); *F05D 2270/05* (2013.01)

(58) Field of Classification Search
CPC .... F02C 3/305; F02C 3/06; F02C 3/30; F02C 6/04; F02C 9/18; F02C 9/20; F02C 9/40; F05D 2220/32; F05D 2220/72
See application file for complete search history.

(56) References Cited

U.S. PATENT DOCUMENTS

| | | | | |
|---|---|---|---|---|
| 3,585,795 A | * | 6/1971 | Grieb | F02C 9/18 |
| | | | | 60/39.15 |
| 3,747,336 A | * | 7/1973 | Dibelius | F02C 3/305 |
| | | | | 60/39.55 |
| 3,785,146 A | * | 1/1974 | Bailey | F02C 3/305 |
| | | | | 60/39.55 |
| 4,509,324 A | * | 4/1985 | Urbach | F02C 7/143 |
| | | | | 60/39.55 |

(Continued)

FOREIGN PATENT DOCUMENTS

| | | |
|---|---|---|
| JP | 10-246127 | 9/1998 |
| JP | 2001-182553 | 7/2001 |

(Continued)

*Primary Examiner* — Steven M Sutherland
(74) *Attorney, Agent, or Firm* — Wenderoth, Lind & Ponack, L.L.P.

(57) ABSTRACT

A gas turbine plant includes a connection line configured to connect an outlet of a compressor high-pressure stage and an inlet of a turbine via a combustor, a bypass line configured to cause some or all of air compressed at a compressor low-pressure stage to bypass the compressor high-pressure stage and to be supplied to the connection line, and an adjustment device configured to adjust a flow rate of the air flowing through the bypass line. A plurality of types of fluid are supplied to the connection line in addition to the air compressed by the compressor, and during operation of the gas turbine plant, supply of at least one type of fluid of the plurality of types of fluid to the connection line is stopped according to an operating state of the gas turbine plant.

17 Claims, 29 Drawing Sheets

(56) References Cited

U.S. PATENT DOCUMENTS

| | | | | |
|---|---|---|---|---|
| 5,271,215 | A | * 12/1993 | Guillet | F02C 7/08 |
| | | | | 60/39.55 |
| 6,370,862 | B1 | * 4/2002 | Cheng | F23R 3/06 |
| | | | | 60/39.55 |
| 2009/0053036 | A1 | 2/2009 | Crawley et al. | |
| 2012/0042658 | A1 | * 2/2012 | Eto | F02C 3/28 |
| | | | | 60/39.463 |
| 2015/0369125 | A1 | * 12/2015 | Reiter | F01K 13/02 |
| | | | | 60/39.182 |
| 2018/0030903 | A1 | 2/2018 | Asti et al. | |

FOREIGN PATENT DOCUMENTS

| | | |
|---|---|---|
| JP | 2002-317651 | 10/2002 |
| JP | 2009-052548 | 3/2009 |
| JP | 2011-185240 | 9/2011 |
| JP | 2015-206326 | 11/2015 |
| JP | 2018-513295 | 5/2018 |

\* cited by examiner

GAS TURBINE PLANT

CROSS-REFERENCE TO RELATED APPLICATIONS

This application claims the benefit of priority to Japanese Patent Application Number 2020-031078 filed on Feb. 26, 2020. The entire contents of the above-identified application are hereby incorporated by reference.

TECHNICAL FIELD

The disclosure relates to a gas turbine plant.

RELATED ART

A gas turbine includes a compressor, a combustor configured to mix and combust the air compressed by the compressor with fuel, and a turbine configured to be driven by the combustion gas generated by the combustor.

JP 2002-317651 A discloses that, in a gas turbine plant, the output of a turbine can be increased by injecting the combustor with steam generated by a waste heat boiler that recovers waste heat of a turbine.

SUMMARY

According to the knowledge of the present inventors, in a gas turbine plant, the output of the turbine can be increased by supplying steam not only to the combustor but also between the outlet of the compressor and the inlet of the turbine.

However, when steam is supplied between the outlet of the compressor and the inlet of the turbine, the pressure at the outlet of the compressor increases, and the supply amount of steam leads to surging in the compressor.

In a configuration in which a plurality of types of fuel having different calorific values can be supplied to the combustor, when fuel having a low calorific value is supplied to the combustor, the fuel flow rate required to obtain the same output is greater than in a case where fuel having a higher calorific value is supplied to the combustor, which increases the pressure at the outlet of the compressor. Thus, when fuel having a low calorific value is supplied to the combustor, surging is likely to occur in the compressor.

As described above, when the flow rate (volumetric flow rate) of the fluid, such as steam or fuel, supplied between the outlet of the compressor and the inlet of the turbine in the gas turbine is increased, the pressure at the outlet of the compressor increases, and surging is likely to occur in the compressor.

In light of the foregoing, an object of the present disclosure is to provide a gas turbine plant capable of suppressing surging in a compressor.

In order to achieve the above-described object, a gas turbine plant according to the present disclosure is a gas turbine plant including:

a compressor including a compressor low-pressure stage for compressing air, and a compressor high-pressure stage for further compressing the air compressed at the compressor low-pressure stage;

a combustor configured to mix and combust the air compressed by the compressor and fuel;

a turbine configured to be driven by combustion gas generated in the combustor;

a connection line configured to connect an outlet of the compressor high-pressure stage and an inlet of the turbine via the combustor;

a bypass line configured to cause some or all of the air compressed at the compressor low-pressure stage to bypass the compressor high-pressure stage and to be supplied to the connection line; and an adjustment device configured to adjust a flow rate of the air flowing through the bypass line, in which a plurality of types of fluid are supplied to the connection line in addition to the air compressed by the compressor, and during operation of the gas turbine plant, supply of at least one type of fluid of the plurality of types of fluid to the connection line is stopped according to an operating state of the gas turbine plant.

In addition, in order to achieve the above-described object, another gas turbine plant according to the present disclosure includes:

a compressor;

a combustor configured to mix and combust the air compressed by the compressor with fuel;

a turbine configured to be driven by combustion gas generated in the combustor;

a connection line configured to connect an outlet of the compressor and an inlet of the turbine via the combustor;

a plurality of supply lines configured to supply steam or water having different enthalpies to the connection line;

a plurality of adjustment devices provided in the plurality of supply lines, respectively, and configured to adjust an amount of steam or water to be supplied to the connection line; and a control device configured to control the plurality of adjustment devices, in which the control device is configured to increase an output of the turbine by controlling the plurality of adjustment devices to increase a supply amount of steam or water to be supplied to the connection line in order from steam or water having relatively higher enthalpy, among steam or water in the plurality of supply lines.

According to the present disclosure, a gas turbine plant capable of suppressing surging in a compressor is provided.

BRIEF DESCRIPTION OF DRAWINGS

The disclosure will be described with reference to the accompanying drawings, wherein like numbers reference like elements.

DESCRIPTION OF EMBODIMENTS

Embodiments of the present disclosure will be described hereinafter with reference to the appended drawings. It is intended, however, that unless particularly specified, dimensions, materials, shapes, relative positions and the like of components described in the embodiments shall be interpreted as illustrative only and not intended to limit the scope of the disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, and also includes a state where the arrangement is relatively displaced by a tolerance, or by an angle or a distance whereby it is possible to achieve the same function.

For instance, an expression of an equal state such as "same", "equal" and "uniform" shall not be construed as indicating only the state in which the feature is strictly equal, and also includes a state in which there is a tolerance or a difference that can still achieve the same function.

Further, for instance, an expression of a shape such as a rectangular shape or a cylindrical shape shall not be construed as only a geometrically strict shape, and also includes a shape with unevenness or chamfered corners within the range in which the same effect can be achieved.

On the other hand, an expression such as "comprise", "include", "have", "contain" and "constitute" is not intended to be exclusive of other components.

Figure 1:
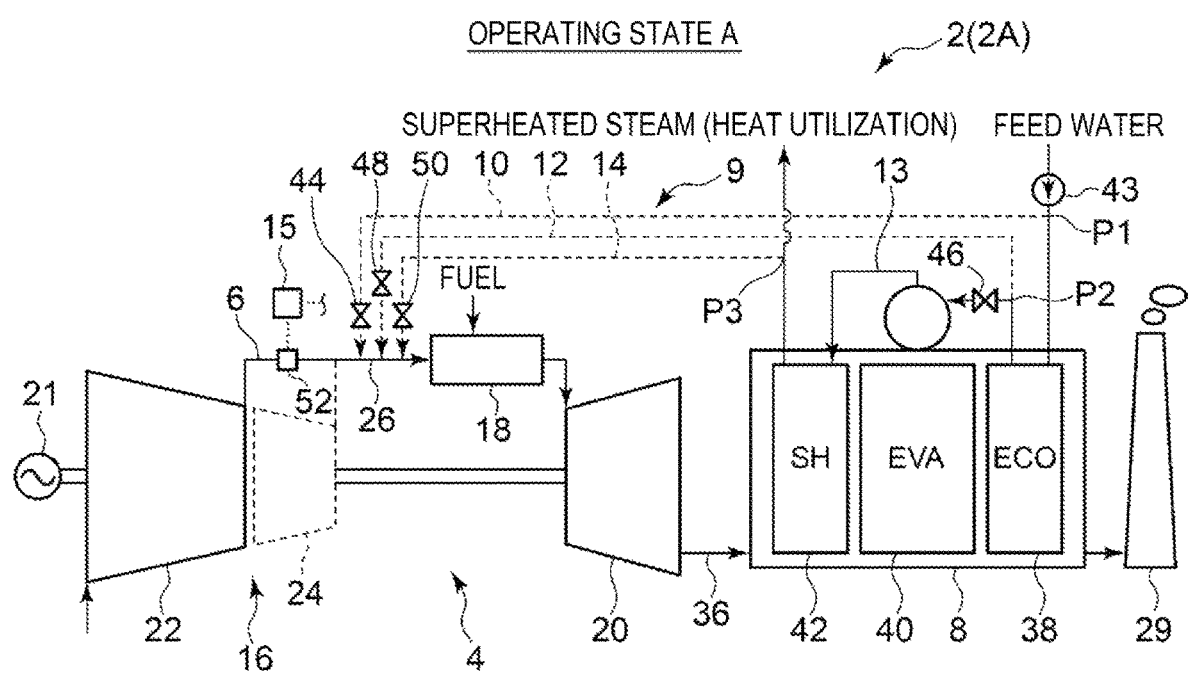
FIG. 1 is a diagram illustrating a schematic configuration of a gas turbine plant 2 (2A) according to an embodiment.

FIG. 1 is a diagram illustrating a schematic configuration of a gas turbine plant 2 (2A) according to an embodiment. The gas turbine plant 2 (2A) illustrated in FIG. 1 is configured as a cogeneration plant capable of generating power and supplying heat.

As illustrated in FIG. 1, the gas turbine plant 2 includes a gas turbine 4, a bypass line 6, a heat recovery steam generator 8, a low-temperature feed water line 10, a high-temperature feed water line 12, a saturated-steam line 13, a superheated-steam line 14, a control device 15, and a generator 21.

The gas turbine 4 includes a compressor 16, a combustor 18 configured to mix and combust the air compressed by the compressor 16 with fuel, and a turbine 20 configured to be driven by the combustion gas generated by the combustor 18. Further, the generator 21 is connected to the gas turbine 4.

The compressor 16 includes a compressor low-pressure stage 22 for compressing air and a compressor high-pressure stage 24 for further compressing the air compressed at the compressor low-pressure stage 22. The outlet of the compressor high-pressure stage 24 (the outlet of the compressed air) and the inlet of the turbine 20 (the inlet of the combustion gas supplied from the combustor 18) are connected via a connection line 26, and the combustor 18 is provided on the connection line 26. In other words, the connection line 26 connects the outlet of the compressor high-pressure stage 24 and the inlet of the turbine 20 via the combustor 18. The compressed air compressed at the compressor high-pressure stage 24 flows into the combustor 18 through the connection line 26, and the combustion gas generated by the combustor 18 flows into the turbine 20 through the connection line 26.

The bypass line 6 is configured such that a part or all of the air compressed at the compressor low-pressure stage 22 bypasses the compressor high-pressure stage 24 and can be supplied between the outlet of the compressor high-pressure stage 24 and the inlet of the turbine 20, that is, to the connection line 26. The bypass line 6 is provided with an adjustment device 52 configured to adjust the flow rate of the air flowing through the bypass line 6. The adjustment device 52 may be, for example, a valve used for freely adjusting the degree of opening, an on-off valve used for switching between a fully open state and a fully closed state, or may have other configurations described later. Note that the outlet of the compressor high-pressure stage 24 refers to the position of the trailing edge of a stator vane 28 located on the most downstream side of a plurality of stator vanes 28 (for example, see FIG. 20) provided in the compressor 16, and the inlet of the turbine 20 more specifically refers to the position of the leading edge of the stator vane located on the most upstream side among a plurality of stator vanes (not illustrated) provided in the turbine 20.

In the illustrated exemplary configuration, the bypass line 6 is configured to connect the outlet of the compressor low-pressure stage 22 (the outlet of the compressed air) to an intermediate position of the connection line 26. When the air compressed at the compressor low-pressure stage 22 flows into the bypass line 6, the air bypasses the compressor high-pressure stage 24, flows into the connection line 26, and is supplied to the combustor 18.

The heat recovery steam generator (HRSG) 8 is connected to the outlet of the turbine 20 (the outlet of the exhaust gas) via an exhaust gas line 36, and is configured to heat water and steam using the heat of the exhaust gas of the turbine 20.

In the illustrated exemplary configuration, the heat recovery steam generator 8 includes an economizer (ECO) 38 that heats feed water, an evaporator (EVA) 40 that evaporates water, and a superheater (SH) 42 that heats the saturated steam generated by the evaporator 40 to or above saturation temperature to generate superheated steam. The economizer 38, the evaporator 40, and the superheater 42 are disposed in the heat recovery steam generator 8 in the stated order from the downstream side in the flow direction of the exhaust gas of the turbine 20. The exhaust gas that has passed through the heat recovery steam generator 8 is appropriately purified and discharged from a chimney 29 into the atmosphere.

The low-temperature feed water line 10 is provided with a feed water pump 43, and the low-temperature feed water line 10 branches at a branching position P1 on the downstream side of the feed water pump 43, and is connected to the economizer 38 and the connection line 26. As described above, the low-temperature feed water line 10 is configured such that the water boosted by the feed water pump 43 can be supplied to the economizer 38 and the connection line 26. An adjustment device 44 is provided between the branching position P1 in the low-temperature feed water line 10 and the connection line 26 to adjust the flow rate of the low-temperature feed water supplied to the connection line 26. The water supplied from the low-temperature feed water line 10 is injected into the connection line 26. Note that the adjustment device 44 may be, for example, a valve used for freely adjusting the degree of opening, or may be an on-off valve used for switching between a fully open state and a fully closed state.

The water supplied from the low-temperature feed water line 10 to the economizer 38 is heated by the exhaust gas of the turbine 20 in the economizer 38 to raise the temperature, and becomes high-temperature water.

The high-temperature feed water line 12 connects the economizer 38 and the evaporator 40. The high-temperature feed water line 12 branches at a branching position P2 between the economizer 38 and the evaporator 40, and is connected to the connection line 26. As described above, the high-temperature feed water line 12 is configured such that the high-temperature water of which the temperature is raised by the economizer 38 can be supplied to the evaporator 40 and the connection line 26. An adjustment device 46 for adjusting the flow rate of the high-temperature water supplied to the evaporator 40 is provided between the branching position P2 in the high-temperature feed water line 12 and the evaporator 40. An adjustment device 48 for adjusting the flow rate of high-temperature water supplied to the connection line 26 is provided between the branching position P2 in the high-temperature feed water line 12 and the connection line 26. The high-temperature water supplied from the high-temperature feed water line 12 is injected into the connection line 26. Note that the adjustment devices 46 and 48 may be, for example, a valve used for freely adjusting the degree of opening, or may be an on-off valve used for switching between a fully open state and a fully closed state.

The saturated-steam line 13 connects the evaporator 40 and the superheater 42. The high-temperature water supplied from the economizer 38 to the evaporator 40 is heated by heat exchange with the exhaust gas of the turbine by the evaporator 40 to thereby evaporate and become saturated steam. The saturated steam is then supplied to the superheater 42 via the saturated-steam line 13.

The superheated-steam line 14 connects the superheater 42 and the connection line 26. The superheated-steam line 14 branches at a branching position P3 between the superheater 42 and the connection line 26, and extends to the outside of the gas turbine plant 2. As described above, the superheated-steam line 14 is configured such that the superheated steam generated by the superheater 42 can be supplied to the outside of the gas turbine plant 2 and to the connection line 26. The superheated steam supplied from the superheated-steam line 14 to the outside of the gas turbine plant 2 is used to satisfy an external heat demand of the gas turbine plant 2 (for example, a heat demand from external factories and regional heat supply plants).

An adjustment device 50 for adjusting the flow rate of the superheated steam to be supplied to the connection line 26 is provided between the branching position P3 in the superheated-steam line 14 and the connection line 26. The superheated steam supplied from the superheated-steam line 14 is injected into the connection line 26. Note that the adjustment device 50 may be, for example, a valve used for freely adjusting the degree of opening, or may be an on-off valve used for switching between a fully open state and a fully closed state.

As described above, in addition to the air compressed by the compressor 16, a plurality of types of fluid (fuel, low-temperature feed water, high-temperature feed water, and superheated steam) are supplied to the connection line 26. In addition, the low-temperature feed water line 10, the high-temperature feed water line 12, the superheated-steam line 14, and the adjustment devices 44, 48, and 50 constitute a supply device 9 used for supplying steam and water to the connection line 26.

Here, several operating states of the gas turbine plant 2 will be described with reference to FIGS. 1 to 4.

Figure 2:
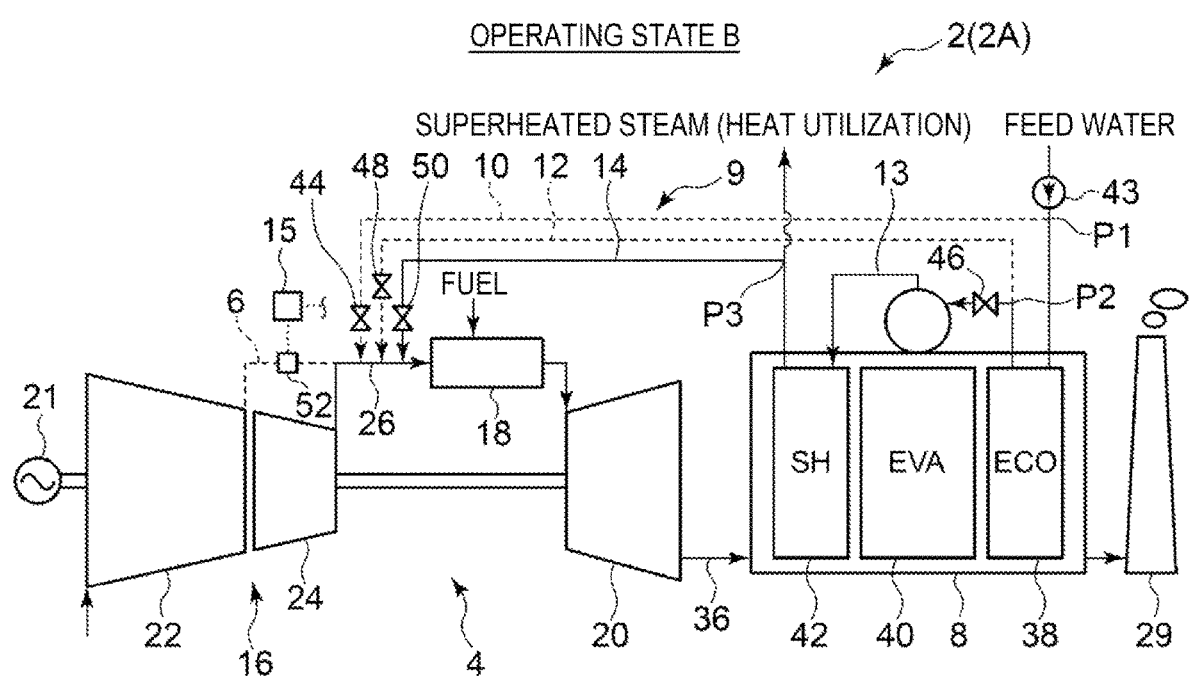
FIG. 2 is a diagram illustrating a schematic configuration of the gas turbine plant 2 (2A) according to the embodiment, and illustrates an operating state B in which the supply amount of superheated steam to the outside is reduced and power generation end output is increased, compared to an operating state A illustrated in FIG. 1.
Figure 3:
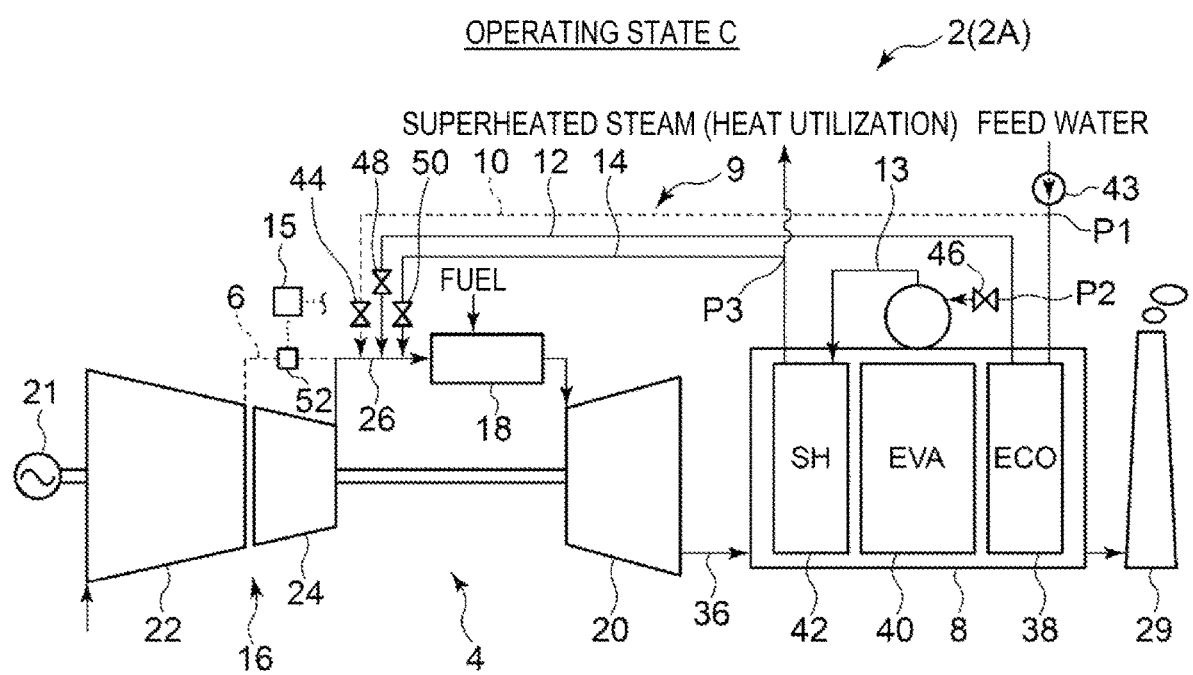
FIG. 3 is a diagram illustrating a schematic configuration of the gas turbine plant 2 (2A) according to the embodiment, and illustrates an operating state C in which the supply amount of superheated steam to the outside is increased while maintaining the power generation end output, compared to the operating state B.
Figure 4:
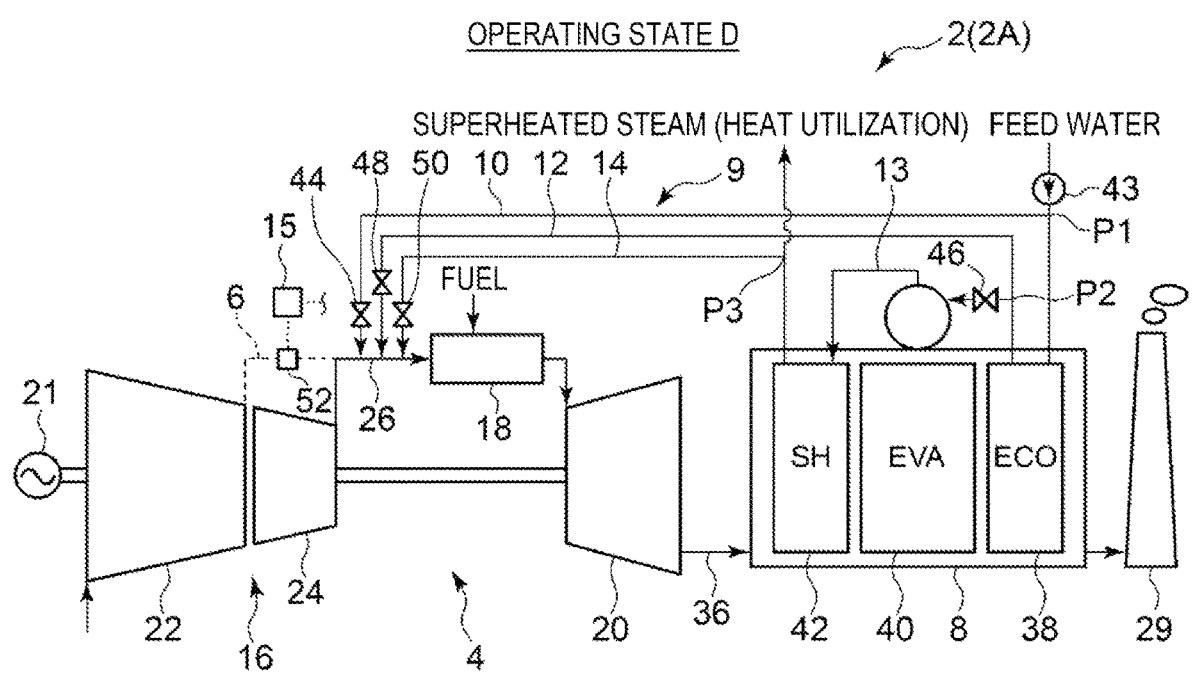
FIG. 4 is a diagram illustrating a schematic configuration of the gas turbine plant 2 (2A) according to the embodiment, and illustrates an operating state D in which the supply amount of superheated steam to the outside is increased while maintaining the power generation end output, compared to the operating state C.

FIGS. 2 to 4 illustrate the same configuration as the gas turbine plant 2 illustrated in FIG. 1, but the operating states of the gas turbine plant 2 are different from each other.

With respect to each line illustrated in FIGS. 1 to 4, when each line is indicated by a solid line, this indicates a state in which each line is open and fluid is flowing, and when each line is indicated by a dotted line, this indicates a state in which each line is closed and fluid is not flowing.

Figure 5:
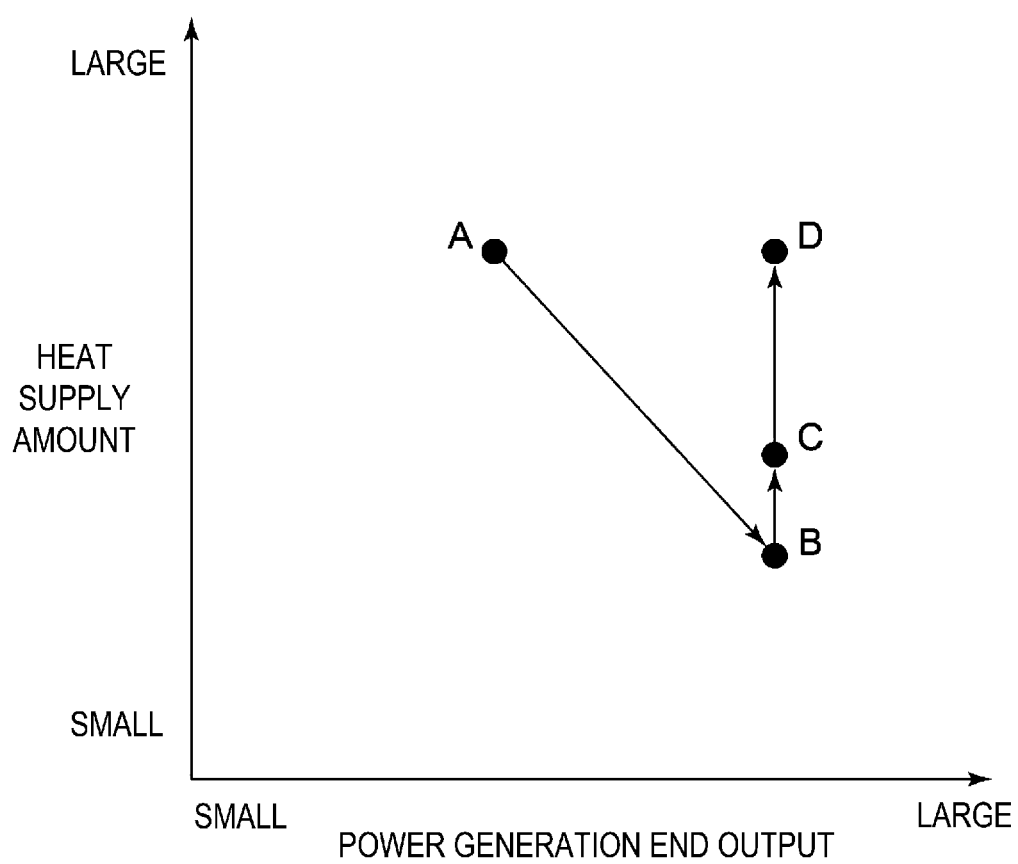
FIG. 5 is a diagram illustrating a relationship between the power generation end output in the operating state A to the operating state D (the output of a generator 21, that is, the output of a turbine 20) and a heat supply amount (the heat supply amount of superheated steam supplied from a superheated-steam line 14 to the outside of the gas turbine plant 2).

When the normal operating state of the gas turbine plant 2 illustrated in FIG. 1 is an operating state A, the operating state of the gas turbine plant 2 illustrated in FIG. 2 is an operating state B, the operating state of the gas turbine plant 2 illustrated in FIG. 3 is an operating state C, and the operating state of the gas turbine plant 2 illustrated in FIG. 4 is an operating state D, a relationship between the power generation end output in the operating state A to the operating state D (the output of the generator 21, that is, the output of the turbine 20) and the heat supply amount (the heat supply amount of superheated steam supplied from the superheated-steam line 14 to the outside of the gas turbine plant 2) is as illustrated in FIG. 5.

The control device 15 controls at least the adjustment devices 44, 48, 50, and 52 to switch the operating state of the gas turbine plant 2 illustrated in FIGS. 1 to 4. Note that the control device 15 may be an electrical circuit or a computer. When the control device 15 is a computer, the control device 15 includes storage devices such as a Random Access Memory (RAM) and a Read Only Memory (ROM), and processors such as a Central Processing Unit (CPU) and a Graphics Processing Unit (GPU), and the functions of the control device 15 are implemented by the processors executing programs stored in the storage devices.

In the operating state A illustrated in FIG. 1, the adjustment devices 44, 48, and 50 are closed and the adjustment devices 46 and 52 are opened. Thus, the supply of low-temperature feed water from the low-temperature feed water line 10 to the connection line 26 is stopped, the supply of high-temperature feed water from the high-temperature feed water line 12 to the connection line 26 is stopped, and the supply of the superheated steam from the superheated-steam line 14 to the connection line 26 is stopped. In addition, because the adjustment device 52 is open, a portion of the air compressed at the compressor low-pressure stage 22 bypasses the compressor high-pressure stage 24, passes through the bypass line 6, and is supplied to the combustor 18. As described above, in a case where neither steam nor water is supplied to the connection line 26 by the low-temperature feed water line 10, the high-temperature feed water line 12, and the superheated-steam line 14, the bypass line 6 is opened by the adjustment device 52. In the operating state A illustrated in FIG. 1, the total amount of superheated steam superheated by the superheater 42 is used to satisfy an external heat demand of the gas turbine plant 2.

FIG. 2 illustrates the operating state B in which the supply amount of the superheated steam to the outside is reduced and the power generation end output is increased, relative to the operating state A. In the operating state illustrated in FIG. 2, the adjustment devices 44, 48, and 52 are closed and the adjustment devices 46 and 50 are opened. Thus, the supply of low-temperature feed water from the low-temperature feed water line 10 to the connection line 26 is stopped, and the supply of high-temperature feed water from the high-temperature feed water line 12 to the connection line 26 is stopped, but the superheated steam is supplied from the superheated-steam line 14 to the connection line 26. In addition, because the adjustment device 52 is closed, air compressed at the compressor low-pressure stage 22 is supplied to the combustor 18 through the compressor high-pressure stage 24 without flowing into the bypass line 6. As described above, when steam is supplied to the connection line 26 by the superheated-steam line 14, the bypass line 6 is closed by the adjustment device 52. In the operating state B illustrated in FIG. 2, a portion of the superheated steam superheated by the superheater 42 is used to satisfy an external heat demand of the gas turbine plant 2, and the remainder of the superheated steam superheated by the superheater 42 is injected into the connection line 26. Thus, as compared to the operating state A, the amount of steam injected from the superheated-steam line 14 to the connection line 26 can be increased and the power generation end output can be increased.

FIG. 3 illustrates the operating state C in which the supply amount of superheated steam to the outside is increased while maintaining the power generation end output, compared with the operating state B. In the operating state illustrated in FIG. 3, the adjustment devices 44 and 52 are closed and the adjustment devices 46, 48, and 50 are opened. Thus, the supply of low-temperature feed water from the low-temperature feed water line 10 to the connection line 26 is stopped, high-temperature feed water is supplied from the high-temperature feed water line 12 to the connection line 26, and superheated steam is supplied from the superheated-steam line 14 to the connection line 26. In addition, because the adjustment device 52 is closed, air compressed at the compressor low-pressure stage 22 is supplied to the combustor 18 through the compressor high-pressure stage 24 without flowing into the bypass line 6. As described above, when water or steam is supplied to the connection line 26 by the high-temperature feed water line 12 and the superheated-steam line 14, the bypass line 6 is closed by the adjustment device 52. In the operating state C illustrated in FIG. 3, similar to the operating state B, a portion of the superheated steam superheated by the superheater 42 is used to satisfy an external heat demand of the gas turbine plant 2, and the remainder of the superheated steam superheated by the superheater 42 is injected into the connection line 26. However, as compared with the operating state B, the external heat demand is increased and the supply amount of superheated steam is increased, so that the amount of superheated steam that can be injected into the connection line 26 is reduced. Thus, a portion of the high-temperature water heated by the economizer 38 is injected into the connection line 26, and the power generation end output equivalent to the operating state B is maintained. Thus, the supply amount of the superheated steam to the outside can be increased while maintaining the power generation end output, as compared with the operating state B.

FIG. 4 illustrates the operating state D in which the supply amount of superheated steam to the outside is increased while maintaining the power generation end output, compared with the operating state C. In the operating state illustrated in FIG. 4, the adjustment device 52 is closed and the adjustment devices 44, 46, 48, and 50 are opened. Therefore, low-temperature feed water is supplied from the low-temperature feed water line 10 to the connection line 26, high-temperature feed water is supplied from the high-temperature feed water line 12 to the connection line 26, and superheated steam is supplied from the superheated-steam line 14 to the connection line 26. In addition, because the adjustment device 52 is closed, air compressed at the compressor low-pressure stage 22 is supplied to the combustor 18 through the compressor high-pressure stage 24 without flowing into the bypass line 6. As described above, when water or steam is supplied to the connection line 26 from the low-temperature feed water line 10, the high-temperature feed water line 12, and the superheated-steam line 14, the bypass line 6 is closed by the adjustment device 44. In the operating state D illustrated in FIG. 4, a portion of the superheated steam superheated by the superheater 42 is used to satisfy an external heat demand of the gas turbine plant 2, and the remainder of the superheated steam superheated by the superheater 42 is injected into the connection line 26. Further, a portion of the water flowing through the low-temperature feed water line 10 and a portion of the high-temperature water heated by the economizer 38 are injected into the connection line 26. Therefore, the amount of superheated steam injected into the connection line 26, required to obtain the same power generation end output, can be reduced compared to the operating state C, so that the supply amount of superheated steam to the outside can be increased while maintaining the power generation end output.

As described above, the gas turbine plant 2 is configured such that, during operation of the gas turbine plant 2, the supply of the plurality of types of fluid (low-temperature feed water, high-temperature feed water, and superheated steam) to the connection line 26 can be stopped according to the operating state of the gas turbine plant 2. In addition, in the operating state A, steam is not injected from the superheated-steam line 14 to the connection line 26, while in the operating states B to D, steam is injected from the superheated-steam line 14 to the connection line 26. Thus, in the operating states B to D, the pressure at the outlet of the compressor high-pressure stage 24 increases and surging is likely to occur in the compressor 16, but the compressor high-pressure stage 24 is used only when steam is injected into the connection line 26 from the superheated-steam line 14, so that it is possible to increase the power generation end output while suppressing surging in the compressor 16. As described above, when the supply of at least one type of predetermined fluid (for example, superheated steam) among the plurality of types of fluid to the connection line 26 is stopped, the bypass line 6 is opened by the adjustment device 52.

In addition, the control device 15 controls the adjustment devices 44, 48, 50, and 52 to increase the power generation end output by increasing the supply amount of steam or water to be supplied to the connection line 26 in the order of the superheated-steam line 14, the high-temperature feed water line 12, and the low-temperature feed water line 10. That is, the control device 15 increases the power generation end output by controlling the adjustment devices 44, 48, 50, and 52 to increase the supply amount of water or steam to be supplied to the connection line 26 in order from water or steam with relatively higher enthalpy, among the water or steam from the low-temperature feed water line 10, the high-temperature feed water line 12, and the superheated-steam line 14. In other words, the control device 15 increases the power generation end output by controlling the adjustment devices 44, 48, 50, and 52 to increase the supply amount of water or steam to be supplied to the connection line 26, in order from water or steam with relatively higher temperature, among the water or steam from the low-temperature feed water line 10, the high-temperature feed water line 12, and the superheated-steam line 14.

As described above, by preferentially injecting water or steam with higher enthalpy among the remaining steam or water that satisfies the heat demand into the connection line 26, the amount of heat to be supplied to the gas turbine by steam or water is increased, and it is possible to increase the power supply amount and the heat supply amount while suppressing an increase in fuel consumption required to obtain the desired power generation end output (a decrease in power generation end efficiency).

Figure 6:
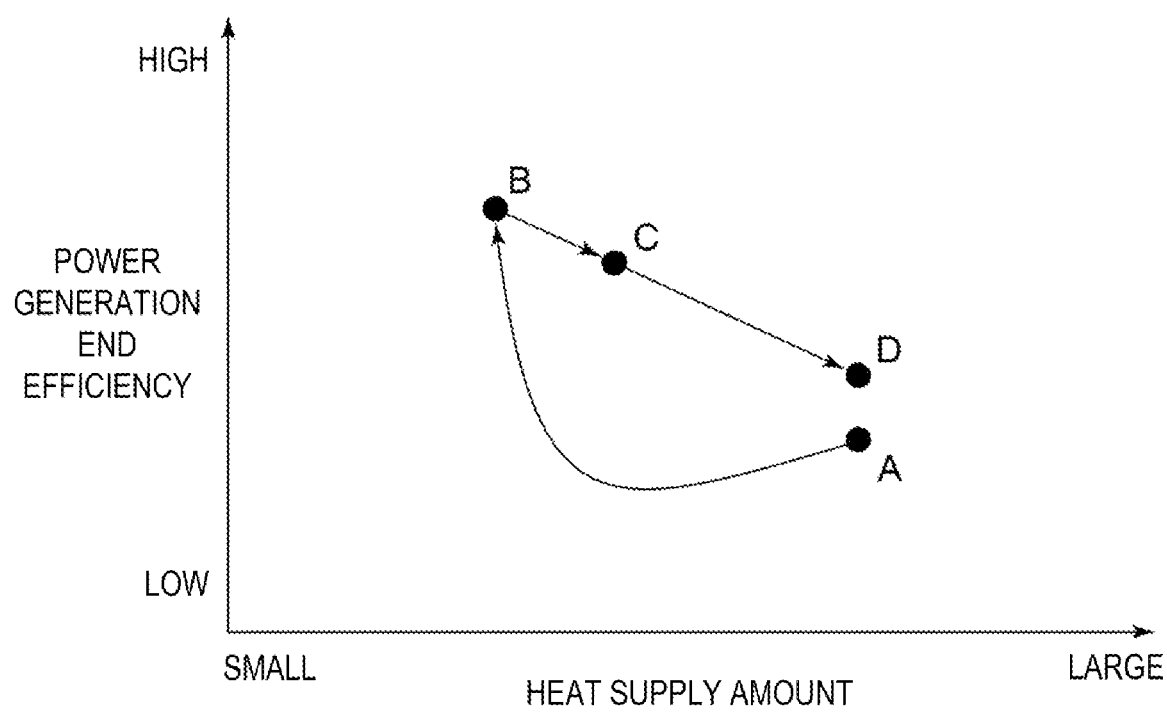
FIG. 6 is a diagram illustrating a relationship between the heat supply amount in the operating state A to the operating state D and power generation end efficiency.

Therefore, as illustrated in FIG. 6, in the operating state B, compared to the operating state A, the heat supply amount decreases due to steam injection, but the power generation end efficiency can be improved. Further, the heat demand increases as the operating state B shifts to the operating state C and the operating state D, but it is possible to increase the heat supply amount while maintaining the power generation end output and minimizing the increase in fuel consumption (decrease in power generation end efficiency).

Next, other embodiments will be described. Note that, in the other embodiments described below, reference numerals common to the above-described configurations indicate configurations similar to those described above unless otherwise indicated, and descriptions thereof will be omitted.

Figure 7:
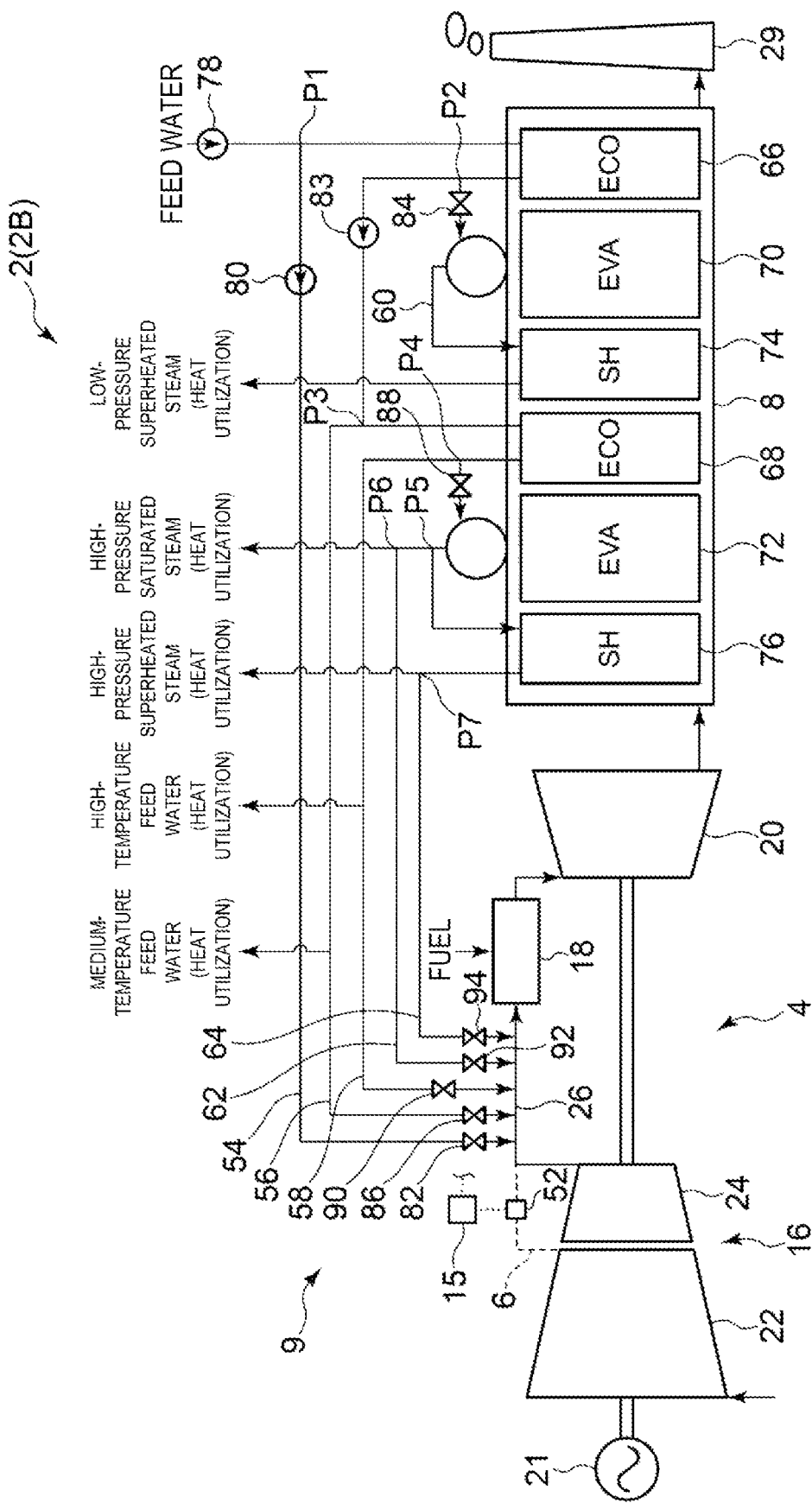
FIG. 7 is a diagram illustrating a schematic configuration of a gas turbine plant 2 (2B) according to an embodiment.

FIG. 7 is a diagram illustrating a schematic configuration of a gas turbine plant 2 (2B) according to an embodiment. The gas turbine plant 2 (2B) illustrated in FIG. 7 is configured as a cogeneration plant capable of generating power and supplying heat. In the configuration illustrated in FIG. 7, the configuration of the heat recovery steam generator 8, the configuration of each line used for supplying steam or water to the gas turbine 4, and the contents of control of the control device 15 are different from the configurations illustrated in FIGS. 1 to 4, as will be described below.

The gas turbine plant 2 (2B) illustrated in FIG. 7 is provided with a low-temperature feed water line 54, a medium-temperature feed water line 56, a high-temperature feed water line 58, a low-pressure superheated-steam line 60, a high-pressure saturated-steam line 62, and a high-pressure superheated-steam line 64.

The heat recovery steam generator 8 of the gas turbine plant 2 (2B) illustrated in FIG. 7 includes economizers 66 and 68, evaporators 70 and 72, and superheaters 74 and 76. The economizer 66, the evaporator 70, the superheater 74, the economizer 68, the evaporator 72, and the superheater 76 are disposed in the heat recovery steam generator 8 in order from the downstream side in the flow direction of the exhaust gas in the turbine.

The low-temperature feed water line 54 is provided with a feed water pump 78, a feed water pump 80, and an adjustment device 82. The low-temperature feed water line 54 branches at a branching position P1 on the downstream side of the feed water pump 78 and is connected to the economizer 66 and the connection line 26. As described above, the low-temperature feed water line 54 is configured such that water boosted by the feed water pump 78 (low-temperature feed water) can be supplied to the economizer 66 and the connection line 26. The feed water pump 80 and the adjustment device 82 are provided between the branching position P1 in the low-temperature feed water line 54 and the connection line 26. The water supplied from the low-temperature feed water line 54 is injected into the connection line 26. The adjustment device 82 is configured to be capable of adjusting the flow rate of the low-temperature feed water to be supplied to the connection line 26, and may be, for example, a valve used for freely adjusting the degree of opening, or may be an on-off valve used for switching between a fully open state and a fully closed state.

A feed water pump 83 and adjustment devices 84 and 86 are provided in the medium-temperature feed water line 56. The medium-temperature feed water line 56 is connected to the outlet of the economizer 66, branches at a branching position P2 on the upstream side of the feed water pump 83, and is connected to the inlet of the evaporator 70. The medium-temperature feed water line 56 branches at a branching position P3 on the downstream side of the feed water pump 83, and is connected to the inlet of the economizer 68 and the connection line 26. As described above, the medium-temperature feed water line 56 is configured such that water heated by the economizer 66 (medium-temperature feed water) can be supplied to the evaporator 70, the economizer 68, and the connection line 26. The adjustment device 84 is provided between the branching position P2 of the medium-temperature feed water line 56 and the evaporator 70. The adjustment device 86 is provided between the branching position P3 of the medium-temperature feed water line 56 and the connection line 26. The water supplied from the medium-temperature feed water line 56 is injected into the connection line 26. The adjustment device 86 is configured to adjust the flow rate of the medium-temperature feed water to be supplied to the connection line 26. The adjustment devices 84 and 86 may be, for example, a valve used for freely adjusting the degree of opening, or may be an on-off valve used for switching between a fully open state and a fully closed state.

Adjustment devices 88 and 90 are provided on the high-temperature feed water line 58. The high-temperature feed water line 58 is connected to the outlet of the economizer 68, branches at a branching position P4, and is connected to the inlet of the evaporator 70 and the connection line 26. As described above, the high-temperature feed water line 58 is configured such that water heated by the economizer 68 (high-temperature feed water) can be supplied to the evaporator 72 and the connection line 26. The adjustment device 88 is provided between the branching position P4 of the high-temperature feed water line 58 and the evaporator 72. The adjustment device 90 is provided between the branching position P4 of the high-temperature feed water line 58 and the connection line 26. The water supplied from the high-temperature feed water line 58 is injected into the connection line 26. The adjustment device 90 is configured to be capable of adjusting the flow rate of the high-temperature feed water to be supplied to the connection line 26, and the adjustment devices 88 and 90 may each be, for example, a valve used for freely adjusting the degree of opening, or may be an on-off valve used for switching between a fully open state and a fully closed state.

The high-pressure saturated-steam line 62 is provided with an adjustment device 92. The high-pressure saturated-steam line 62 is connected to the outlet of the evaporator 72, branches at a branching position P5, and is connected to the superheater 76 and the connection line 26. The high-pressure saturated-steam line 62 branches at a branching position P6 on a downstream side of the branching position P5 and extends to the outside of the gas turbine plant 2. As described above, the high-pressure saturated-steam line 62 is configured such that the high-pressure saturated steam generated by the evaporator 72 can be supplied to the outside of the gas turbine plant 2 and the connection line 26. The high-pressure saturated steam supplied from the saturated-steam line 62 to the outside of the gas turbine plant 2 is used to satisfy an external heat demand of the gas turbine plant 2 (for example, heat demand from external factories and regional heat supply plants). The adjustment device 92 is provided between the branching position P6 in the high-pressure saturated-steam line 62 and the connection line 26, and is configured to adjust the flow rate of the high-pressure saturated steam to be supplied to the connection line 26. The high-pressure saturated steam supplied from the high-pressure saturated-steam line 62 is injected into the connection line 26. Note that the adjustment device 92 may be, for example, a valve used for freely adjusting the degree of opening, or may be an on-off valve used for switching between a fully open state and a fully closed state.

The high-pressure superheated-steam line 64 is provided with an adjustment device 94. The high-pressure superheated-steam line 64 connects the outlet of the superheater 76 and the connection line 26. The high-pressure superheated-steam line 64 branches at a branching position P7 and extends outside the gas turbine plant 2. As described above, the high-pressure superheated-steam line 64 is configured such that the high-pressure superheated steam generated by the superheater 76 can be supplied to the outside of the gas turbine plant 2 and the connection line 26. The high-pressure superheated steam supplied from the high-pressure superheated-steam line 64 to the outside of the gas turbine plant 2 is used to satisfy an external heat demand of the gas turbine plant 2 (for example, heat demand from external factories and regional heat supply plants). The adjustment device 94 is provided between the branching position P7 of the high-pressure superheated-steam line 64 and the connection line 26, and is configured so as to be able to adjust the flow rate of the high-pressure superheated steam to be supplied to the connection line 26. The high-pressure superheated steam supplied from the high-pressure superheated-steam line 64 is injected into the connection line 26. Note that the adjustment device 94 may be, for example, a valve used for freely adjusting the degree of opening, or may be an on-off valve used for switching between a fully open state and a fully closed state.

As described above, in addition to the air compressed by the compressor 16, a plurality of types of fluid (fuel, low-temperature feed water, medium-temperature feed water, high-temperature feed water, high-pressure saturated steam, and high-pressure superheated steam) are supplied to the connection line 26. In addition, the low-temperature feed water line 54, the medium-temperature feed water line 56, the high-temperature feed water line 58, the high-pressure saturated-steam line 62, the high-pressure superheated-steam line 64, and the adjustment devices 82, 86, 90, 92, and 94 constitute the supply device 9 for supplying steam and water to the connection line 26. The gas turbine plant 2 is configured such that, during operation of the gas turbine plant 2, the supply of the plurality of types of fluid (low-temperature feed water, medium-temperature feed water, high-temperature feed water, high-pressure saturated steam, and high-pressure superheated steam) to the connection line 26 can be stopped according to the operating state of the gas turbine plant 2.

In the configuration illustrated in FIG. 7, when neither steam nor water is supplied to the connection line 26 from the low-temperature feed water line 54, the medium-temperature feed water line 56, the high-temperature feed water line 58, the high-pressure saturated-steam line 62, and the high-pressure superheated-steam line 64 (when all the adjustment devices 82, 86, 90, 92, and 94 are closed), the adjustment device 52 causes the bypass line 6 to be opened. In addition, when at least one of steam and water is supplied to the connection line 26 from the low-temperature feed water line 54, the medium-temperature feed water line 56, the high-temperature feed water line 58, the high-pressure saturated-steam line 62, and the high-pressure superheated-steam line 64 (when at least one of the adjustment devices 82, 86, 90, 92, and 94 is open), the adjustment device 52 causes the bypass line 6 to be closed.

As described above, the compressor high-pressure stage 24 is used only when at least one of steam and water is injected into the connection line 26. Because of this, it is possible to increase the power generation end output while suppressing surging in the compressor 16.

In addition, by supplying water from the outlets of the economizers 66 and 68 (the above-described high-temperature feed water and medium-temperature feed water) to the connection line 26, the supply amount of heated water is increased without being subject to the constraints of the pinch temperature of the evaporators 70 and 72, and thus the power generation end output can be increased.

In some embodiments, for example in the gas turbine plant 2 (2B) illustrated in FIG. 7, when the external heat demand is less than a reference level, the control device 15 may be configured to control the plurality of adjustment devices 82, 86, 90, 92, and 94 to supply steam or water with higher enthalpy to the connection line 26 than when the external heat demand is greater than the reference level.

In addition, in some embodiments, for example, in the gas turbine plant 2 (2B) illustrated in FIG. 7, the control device 15 may be configured to increase the supply amount of steam or water supplied to the connection line 26 from the low-temperature feed water line 54, the medium-temperature feed water line 56, the high-temperature feed water line 58, the high-pressure saturated-steam line 62, and the high-pressure superheated-steam line 64 until any one of the following conditions (a) to (c) is satisfied.

(a) The output of the generator 21 reaches the required value.

(b) All available steam or water is consumed.

(c) The state of the gas turbine plant 2 reaches the operational limit of the gas turbine plant 2.

Figure 8:
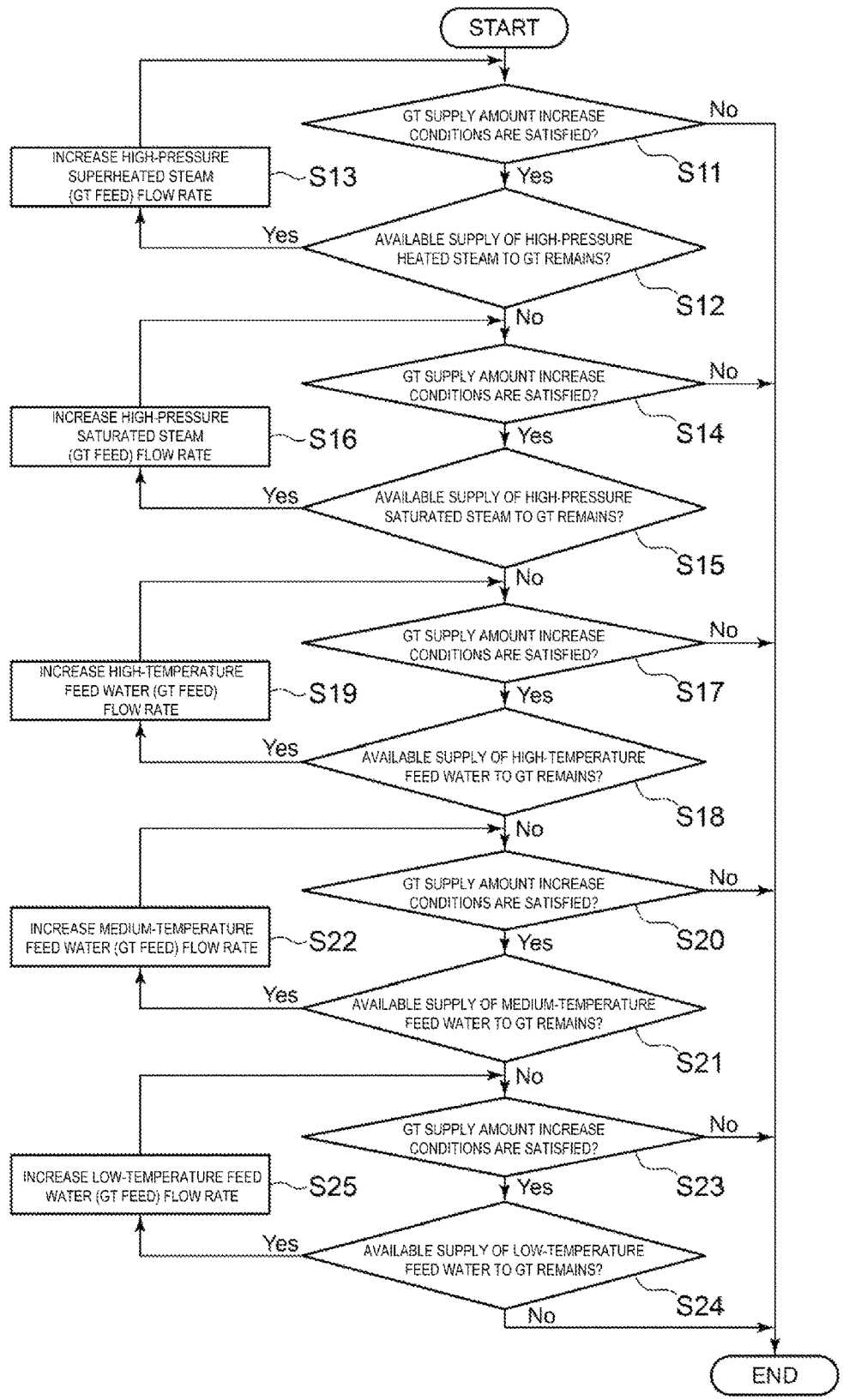
FIG. 8 is a diagram illustrating an example of the control flow of a control device 15 illustrated in FIG. 7.

FIG. 8 is a diagram illustrating an example of the control flow of the control device 15 illustrated in FIG. 7. The control flow illustrated in FIG. 8 is executed by the control device 15 controlling determination or each of the configurations.

As illustrated in FIG. 8, first, in S11, it is determined whether gas turbine supply amount increase conditions are satisfied. The gas turbine supply amount increase conditions are that both (p) the output of the generator 21 has not reached the required value, and (q) the state of the gas turbine plant 2 has not reached the operational limit of the gas turbine plant 2 are satisfied. That is, when both of these conditions (p) and (q) are satisfied, it is meant that the gas turbine supply amount increase conditions are satisfied, and when at least one of these conditions (p) and (q) is not satisfied, it is meant that the gas turbine supply amount increase conditions are not satisfied. Note that the condition (q) is that, for example, all of the following conditions (q1) to (q5) are satisfied.

Condition (q1): the surge margin of the compressor 16 is greater than a reference value (or the pressure at the outlet of the compressor high-pressure stage 24 is lower than a certain value)

Condition (q2): the air temperature at the inlet of the combustor 18 is greater than the dew point temperature at the inlet of the combustor 18 by a certain value or more Condition (q3): the oxygen concentration in the exhaust gas of the turbine 20 is greater than a reference value (or the oxygen concentration in the combustion gas at the outlet of the combustor 18 is greater than the reference value)

Condition (q4): the water vapor concentration in the exhaust gas of the turbine 20 is lower than a reference value (or the water vapor concentration in the combustion gas at the outlet of the combustor 18 is lower than the reference value)

Condition (q5): the temperature of the exhaust gas discharged from the chimney 29 is greater than a certain value Condition (q1) is a condition for suppressing surging in the compressor 16, condition (q2) is a condition for suppressing condensation of moisture in the casing air, condition (q3) is a condition for suppressing an increase in CO concentration associated with combustion instability or incomplete combustion, condition (q4) is a condition for suppressing combustion instability and condensation of moisture in the exhaust gas in the economizers 66 and 68, and condition (q5) is a condition for suppressing condensation of moisture in the exhaust gas in the economizers 66 and 68, and for suppressing corrosion of the economizers 66 and 68 and the chimney 29.

Figure 9:
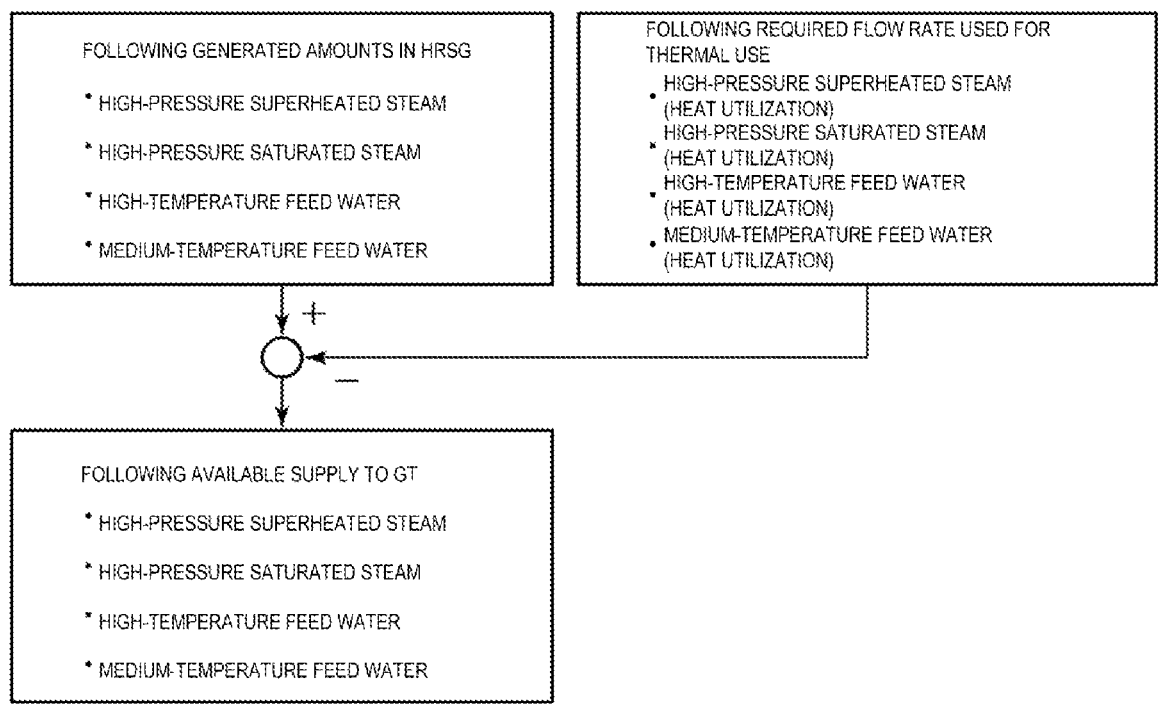
FIG. 9 is a diagram illustrating a method for calculating the amount of each type of steam and water that can be supplied to a gas turbine.

In S11, when the gas turbine supply amount increase conditions are not satisfied, the supply amount of steam and the supply amount of water to the gas turbine 4 (more specifically, the connection line 26) are not increased. In S11, when the gas turbine supply amount increase conditions are satisfied, it is determined at S12 whether the available supply of high-pressure superheated steam to the gas turbine 4 remains. Here, the available supply refers to an amount obtained by subtracting the required flow rate of steam or water of the enthalpy used for heat utilization outside the gas turbine plant 2 from the generation amount of steam or water of the enthalpy in the heat recovery steam generator 8. As illustrated in FIG. 9, the available supply of high-pressure superheated steam to the gas turbine 4 refers to an amount obtained by subtracting the required flow rate of the high-pressure superheated steam used for heat utilization outside the gas turbine plant 2 from the generation amount of the high-pressure superheated steam in the heat recovery steam generator 8. When the available supply of the high-pressure superheated steam to the gas turbine 4 remains in S12, the flow rate of the high-pressure superheated steam to the gas turbine is increased by the adjustment device 94 at S13, and the process returns to S11.

When the available supply of the high-pressure superheated steam to the gas turbine 4 does not remain in S12, it is determined again in S14 whether the above-described gas turbine supply amount increase conditions are satisfied. When the gas turbine supply amount increase conditions are not satisfied in S14, the supply amount of steam and the supply amount of water to the gas turbine 4 are not increased. When the gas turbine supply amount increase conditions are satisfied in S14, it is determined at S15 whether the available supply of high-pressure saturated steam to the gas turbine 4 remains. Here, as illustrated in FIG. 9, the available supply of high-pressure saturated steam to the gas turbine 4 refers to an amount obtained by subtracting the required flow rate of the high-pressure saturated steam used for heat utilization outside the gas turbine plant 2 from the generation amount of the high-pressure saturated steam in the heat recovery steam generator 8. When the available supply of high-pressure saturated steam to the gas turbine 4 remains in S15, the flow rate of the high-pressure saturated steam to the gas turbine 4 is increased by the adjustment device 92 in S16, and the process returns to S14.

When the available supply of high-pressure saturated steam to the gas turbine 4 does not remain in S15, it is determined again in S17 whether the above-described gas turbine supply amount increase conditions are satisfied. When the gas turbine supply amount increase conditions are not satisfied in S17, the supply amount of steam and the supply amount of water to the gas turbine 4 are not increased. When the gas turbine supply amount increase conditions are satisfied in S17, it is determined in S18 whether the available supply of high-temperature feed water to the gas turbine 4 remains. Here, as illustrated in FIG. 9, the available supply of high-temperature feed water to the gas turbine 4 refers to an amount obtained by subtracting the required flow rate of the high-temperature feed water used for heat utilization outside the gas turbine plant 2 from the generation amount of the high-temperature feed water in the heat recovery steam generator 8. When the available supply of high-temperature feed water to the gas turbine 4 remains in S18, the flow rate of the high-temperature feed water to the gas turbine 4 is increased by the adjustment device 90 in S19, and the process returns to S17.

When the available supply of high-temperature feed water to the gas turbine 4 does not remain in S18, it is determined again in S20 whether the above-described gas turbine supply amount increase conditions are satisfied. When the gas turbine supply amount increase conditions are not satisfied in S20, the supply amount of steam and the supply amount of water to the gas turbine 4 are not increased. When the gas turbine supply amount increase conditions are satisfied in S20, it is determined in S21 whether the available supply of medium-temperature feed water to the gas turbine 4 remains. Here, as illustrated in FIG. 9, the available supply of medium-temperature feed water to the gas turbine 4 refers to an amount obtained by subtracting the required flow rate of the medium-temperature feed water used for heat utilization outside the gas turbine plant 2 from the generation amount of the medium-temperature feed water in the heat recovery steam generator 8. When the available supply of medium-temperature feed water to the gas turbine 4 remains in S21, the flow rate of the medium-temperature feed water to the gas turbine 4 is increased by the adjustment device 86 in S22, and the process returns to S20.

When the available supply of medium-temperature feed water to the gas turbine 4 does not remain in S21, it is determined again in S23 whether the above-described gas turbine supply amount increase conditions are satisfied. When the gas turbine supply amount increase conditions are not satisfied in S23, the supply amount of steam and the supply amount of water to the connection line 26 are not increased. When the gas turbine supply amount increase conditions are satisfied in S23, it is determined in S24 whether the available supply of low-temperature feed water to the gas turbine remains. Here, as illustrated in FIG. 9, the available supply of low-temperature feed water to the gas turbine 4 refers to an amount obtained by subtracting the required flow rate of the low-temperature feed water used for heat utilization outside the gas turbine plant 2 from the generation amount of low-temperature feed water in the heat recovery steam generator 8. When the available supply of low-temperature feed water to the gas turbine 4 remains in S24, the flow rate of the low-temperature feed water to the gas turbine 4 is increased by the adjustment device 82 in S25, and the process returns to S23. When the available supply of low-temperature feed water to the gas turbine 4 does not remain in S24, the supply amount of steam or the supply amount of water to the gas turbine 4 is not increased.

Note that the generated amount of high-temperature feed water refers to, for example, the flow rate at which the approach temperature difference of the evaporator 72 (temperature difference obtained by subtracting the feed water temperature at the inlet of the evaporator 72 from the saturation temperature of the evaporator 72) is a constant value. Note that the generated amount of medium-temperature feed water refers to, for example, the flow rate at which the approach temperature difference of the evaporator 70 (temperature difference obtained by subtracting the feed water temperature at the inlet of the evaporator 70 from the saturation temperature of the evaporator 70) is a constant value.

According to the control flow illustrated in FIG. 8, the control device 15 increases the power generation end output by controlling at least the adjustment devices 82, 86, 90, 92, and 94 to increase the supply amount to the connection line 26 of the gas turbine 4 in order of the high-pressure superheated steam, the high-pressure saturated steam, the high-temperature feed water, the medium-temperature feed water, and the low-temperature feed water. Here, the enthalpy of the medium-temperature feed water is higher than the enthalpy of the low-temperature feed water, the enthalpy of the high-temperature feed water is higher than the enthalpy of the medium-temperature feed water, the enthalpy of the high-pressure saturated steam is higher than the enthalpy of the high-temperature feed water, and the enthalpy of the high-pressure superheated steam is higher than the enthalpy of the high-pressure saturated steam. Thus, the control device 15 increases the power generation end output by controlling the adjustment devices 82, 86, 90, 92, and 94 to increase the supply amount of water or steam to be supplied to the connection line 26 in order from water or steam with relatively higher enthalpy, among the water or steam from the low-temperature feed water line 54, the medium-temperature feed water line 56, the high-temperature feed water line 58, the high-pressure saturated-steam line 62, and the high-pressure superheated-steam line 64.

As described above, by preferentially injecting steam or water with high enthalpy into the connection line 26, it is possible to increase the power supply amount and the heat supply amount while suppressing an increase in fuel consumption.

Note that in the example described above, the condition (q) is that all the conditions (q1) to (q5) are satisfied, but it may be that any one of these conditions (q1) to (q5) is satisfied. Further, any one or two or more of the conditions (q1) to (q5) may be excluded from the conditions, or other conditions may be added as appropriate.

Figure 10:
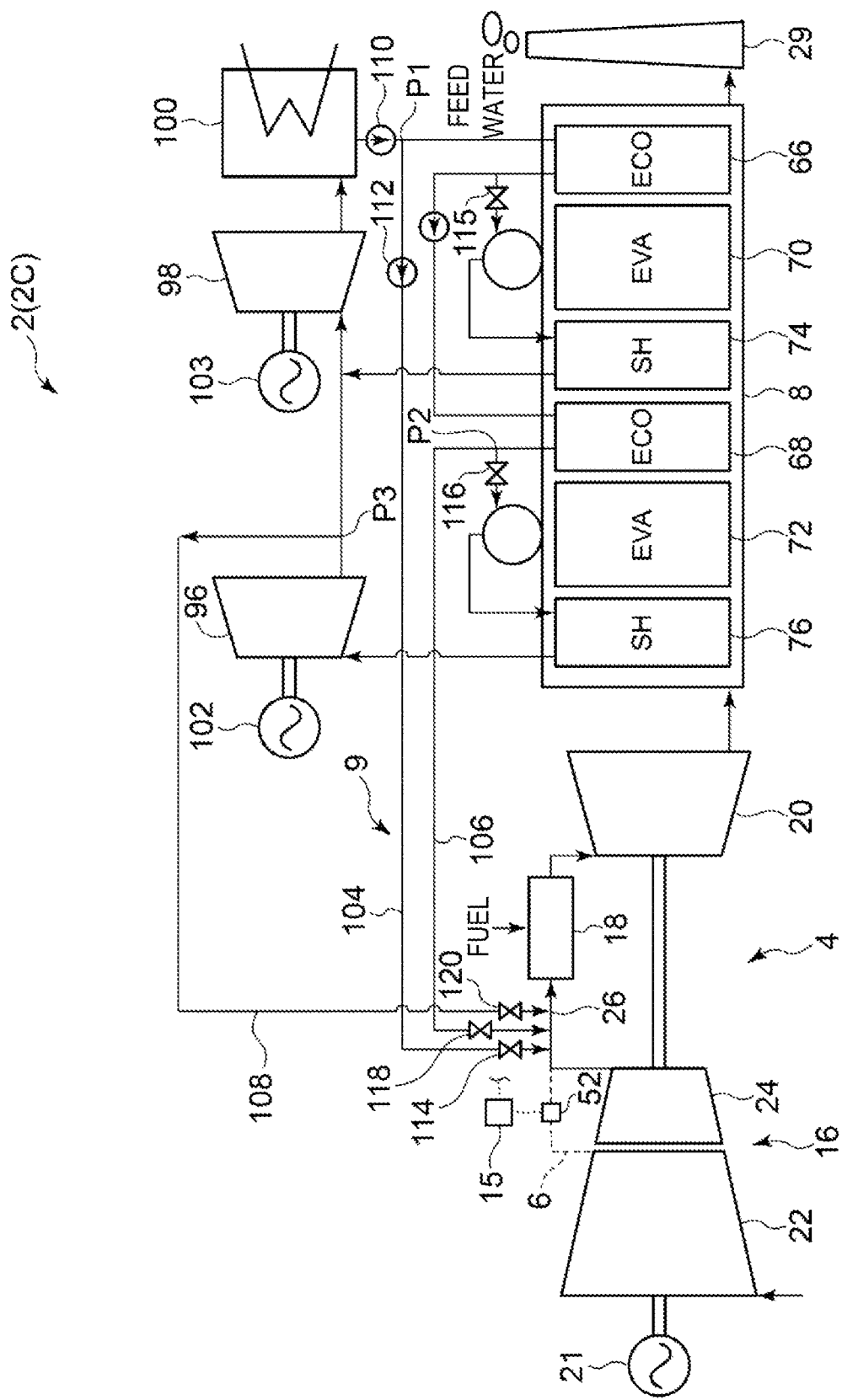
FIG. 10 is a diagram illustrating a schematic configuration of a gas turbine plant 2 (2C) according to an embodiment.

FIG. 10 is a diagram illustrating a schematic configuration of a gas turbine plant 2 (2C) according to an embodiment. In the configuration illustrated in FIG. 10, the gas turbine plant 2 (2C) is configured as a combined cycle power generation plant, as described below. Further, in the configuration illustrated in FIG. 10, the configuration of each line used for supplying steam or water to the gas turbine 4, and the contents of control of the control device 15 are different from those illustrated in FIG. 7.

As illustrated in FIG. 10, the gas turbine plant 2 (2C) includes a high-pressure steam turbine 96, a low-pressure steam turbine 98, a condenser 100, and generators 102 and 103. The generator 102 is connected to the high-pressure steam turbine 96, and the generator 103 is connected to the low-pressure steam turbine 98. The gas turbine plant 2 (2C) includes a low-temperature feed water line 104, a high-temperature feed water line 106, and a superheated-steam line 108.

The low-temperature feed water line 104 is provided with feed water pumps 110 and 112 and an adjustment device 114. The low-temperature feed water line 104 connects the condenser 100 and the inlet of the economizer 66. The low-temperature feed water line 104 branches at a branching position P1 on the downstream side of the feed water pump 110 and is connected to the connection line 26. As described above, the low-temperature feed water line 104 is configured such that water condensed by the condenser 100 (low-temperature feed water) can be supplied to the economizer 66 and the connection line 26. The feed water pump 112 and the adjustment device 114 are provided between the branching position P1 in the low-temperature feed water line 104 and the connection line 26. The water supplied from the low-temperature feed water line 104 is injected into the connection line 26. The adjustment device 114 is configured to be capable of adjusting the flow rate of the low-temperature feed water to be supplied to the connection line 26, and may be, for example, a valve used for freely adjusting the degree of opening, or may be an on-off valve used for switching between a fully open state and a fully closed state.

Water supplied from the low-temperature feed water line 104 to the economizer 66 is heated by the exhaust gas of the turbine 20 in the economizer 66, and then supplied to the evaporator 70 and the economizer 68. The steam generated by the evaporator 70 is supplied to the superheater 74 to become superheated steam, and is then supplied to the low-pressure steam turbine 98.

Adjustment devices 116 and 118 are provided on the high-temperature feed water line 106. The high-temperature feed water line 106 is connected to the outlet of the economizer 68, branches at a branching position P2, and is connected to the evaporator 72 and the connection line 26. As described above, the high-temperature feed water line 106 is configured such that water heated by the economizer 68 (high-temperature feed water) can be supplied to the evaporator 72 and the connection line 26. The adjustment device 116 is provided between the branching position P2 in the high-temperature feed water line 106 and the evaporator 72. The adjustment device 118 is provided between the branching position P2 in the high-temperature feed water line 106 and the connection line 26. The water supplied from the high-temperature feed water line 106 is injected into the connection line 26. The adjustment device 118 is configured to be capable of adjusting the flow rate of the high-temperature feed water to be supplied to the connection line 26, and the adjustment devices 116 and 118 may be, for example, a valve used for freely adjusting the degree of opening, or may be an on-off valve used for switching between a fully open state and a fully closed state.

The high-temperature feed water supplied to the evaporator 72 from the high-temperature feed water line 106 is heated by the exhaust gas of the turbine 20 by the evaporator 72 to become saturated steam, and is supplied to the superheater 76. The steam supplied to the superheater 76 is superheated by the exhaust gas of the turbine 20 by the superheater 76 to become superheated steam, and is then supplied to the high-pressure steam turbine 96 to drive the high-pressure steam turbine 96.

An adjustment device 120 is provided on the superheated-steam line 108. The superheated-steam line 108 is connected to the outlet of the high-pressure steam turbine 96, branches at a branching position P3, and is connected to the inlet of the low-pressure steam turbine 98 and the connection line 26. As described above, the superheated-steam line 108 is configured such that the superheated steam that has exited the high-pressure steam turbine 96 can be supplied to the low-pressure steam turbine 98 and the connection line 26. The adjustment device 120 is provided between the branching position P3 in the superheated-steam line 108 and the connection line 26. The superheated steam supplied from the superheated-steam line 108 is injected into the connection line 26. The adjustment device 120 is configured to be capable of adjusting the flow rate of the superheated steam to be supplied to the connection line 26, and may be, for example, a valve used for freely adjusting the degree of opening, or may be an on-off valve used for switching between a fully open state and a fully closed state.

Figure 11:
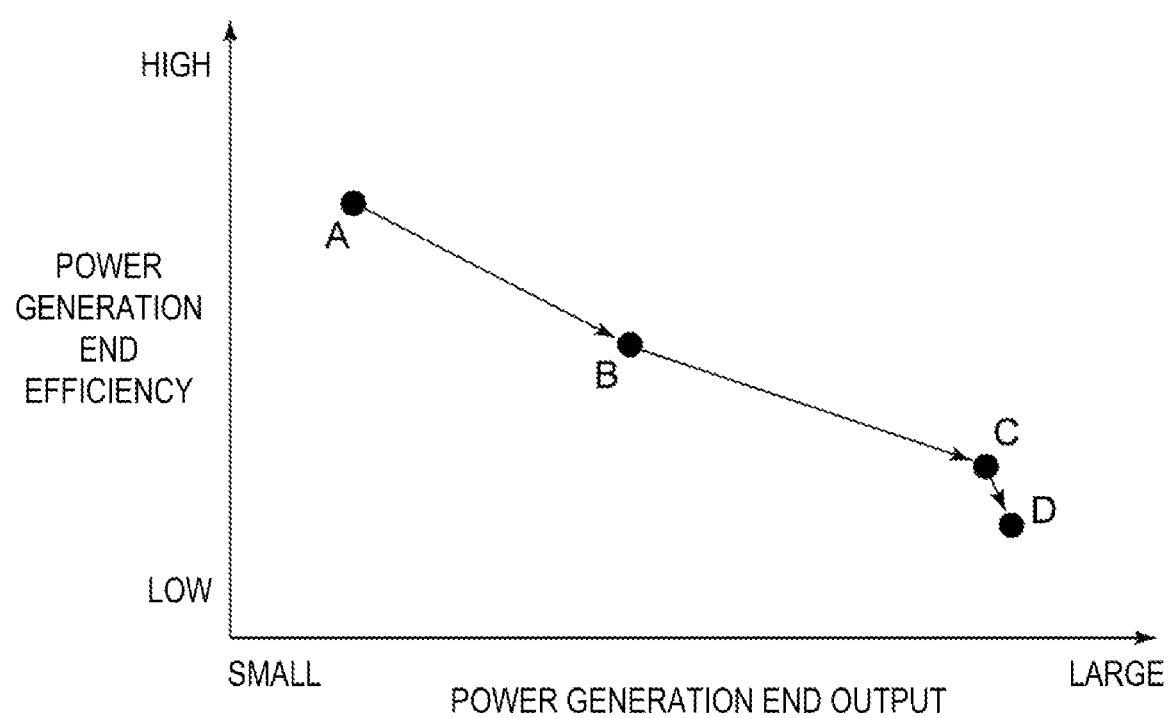
FIG. 11 is a diagram illustrating a relationship between the power generation end output (total value of the outputs of the generator 21, a generator 102, and a generator 103) and the power generation end efficiency according to the operating state of the gas turbine plant 2 (2C) illustrated in FIG. 10.

In the gas turbine plant 2 (2C) illustrated in FIG. 10, the control device 15 controls at least the adjustment devices 52, 114, 118, and 120 to switch between the four operating states A to D illustrated in FIG. 11. FIG. 11 is a diagram illustrating a relationship between the power generation end output (total value of the outputs of the generator 21, the generator 102, and the generator 103) and the power generation end efficiency according to the operating state of the gas turbine plant 2 (2C) illustrated in FIG. 10.

In an operating state A, the adjustment devices 114, 118, and 120 are closed and the adjustment devices 52, 115, and 116 are opened. Thus, in the operating state A, no water is supplied to the connection line 26 from both the low-temperature feed water line 104 and the high-temperature feed water line 106, and no superheated steam is supplied from the superheated-steam line 108 to the connection line 26. In addition, in the operating state A, the adjustment device 52 is open, so that a portion of the air compressed in the compressor low-pressure stage 22 bypasses the compressor high-pressure stage 24, passes through the bypass line 6, and is supplied to the combustor 18. As described above, in a case where neither steam nor water is supplied to the connection line 26 by the low-temperature feed water line 104, the high-temperature feed water line 106, and the superheated-steam line 108, the bypass line 6 is opened by the adjustment device 52. In the operating state A, the total amount of steam that has exited the high-pressure steam turbine 96 is supplied to the low-pressure steam turbine 98.

In an operating state B, the adjustment devices 52, 114, and 118 are closed and the adjustment devices 115, 116, and 120 are opened. Thus, in the operating state B, no water is supplied to the connection line 26 from both the low-temperature feed water line 104 and the high-temperature feed water line 106, but the superheated steam is supplied from the superheated-steam line 108 to the connection line 26. In addition, in the operating state B, because the adjustment device 52 is closed, air compressed at the compressor low-pressure stage 22 is supplied to the combustor 18 through the compressor high-pressure stage 24 without flowing into the bypass line 6. As described above, when steam is supplied to the connection line 26 by the superheated-steam line 108, the bypass line 6 is closed by the adjustment device 52. In the operating state B, a portion of the steam that has exited the high-pressure steam turbine 96 is supplied to the low-pressure steam turbine 98, and the remainder of the steam that has exited the high-pressure steam turbine 96 is injected into the connection line 26. Thus, as illustrated in FIG. 11, in the operating state B, the power generation end output can be increased more than in the operating state A.

In an operating state C, the adjustment devices 52 and 120 are closed and the adjustment devices 114, 115, 116, and 118 are opened. Thus, in the operating state C, water is supplied to the connection line 26 from the low-temperature feed water line 104 and the high-temperature feed water line 106, but no superheated steam is supplied from the superheated-steam line 108 to the connection line 26. In addition, in the operating state C, because the adjustment device 52 is closed, air compressed at the compressor low-pressure stage 22 is supplied to the combustor 18 through the compressor high-pressure stage 24 without flowing into the bypass line 6. As described above, when water is supplied to the connection line 26 by the low-temperature feed water line 104 and the high-temperature feed water line 106, the bypass line 6 is closed by the adjustment device 52. In the operating state C, all the steam that has exited the high-pressure steam turbine 96 is supplied to the low-pressure steam turbine 98. Further, in the operating state C, a portion of the water flowing through the low-temperature feed water line 104 and a portion of the water heated by the economizer 68 are injected into the connection line 26. Thus, as illustrated in FIG. 11, in the operating state C, the power generation end output can be increased more than in the operating state B.

In an operating state D, the adjustment devices 52, 118, and 120 are closed and the adjustment devices 114, 115, and 116 are opened. Thus, in the operating state D, water is supplied from the low-temperature feed water line 104 to the connection line 26, but no water is supplied from the high-temperature feed water line 106 to the connection line 26, and no superheated steam is supplied from the superheated-steam line 108 to the connection line 26. In addition, in the operating state D, because the adjustment device 52 is closed, air compressed at the compressor low-pressure stage 22 is supplied to the combustor 18 through the compressor high-pressure stage 24 without flowing into the bypass line 6. As described above, when water is supplied to the connection line 26 by the low-temperature feed water line 104, the bypass line 6 is closed by the adjustment device 52. In the operating state D, all the steam that has exited the high-pressure steam turbine 96 is supplied to the low-pressure steam turbine 98. Further, a portion of the water flowing through the low-temperature feed water line 104 is injected into the connection line 26. In addition, the flow rate of the water injected from the low-temperature feed water line 104 to the connection line 26 in the operating state D is higher than the flow rate of the water injected from the low-temperature feed water line 104 to the connection line 26 in the operating state C. Thus, as illustrated in FIG. 11, in the operating state D, the power generation end output can be increased more than in the operating state C.

As described above, the gas turbine plant 2 (2C) is configured such that, during operation of the gas turbine plant 2, the supply of the plurality of types of fluid (low-temperature feed water, high-temperature feed water, and superheated steam) to the connection line 26 can be stopped according to the operating state of the gas turbine plant 2. In the operating state A, none of the steam and water are injected from the low-temperature feed water line 104, the high-temperature feed water line 106, and the superheated-steam line 108 to the connection line 26. In the operating states B to D, steam or water is injected into the connection line 26 from at least one of the low-temperature feed water line 104, the high-temperature feed water line 106, and the superheated-steam line 108. Thus, in the operating states B to D, the pressure at the outlet of the compressor high-pressure stage 24 increases, so that surging is likely to occur in the compressor 16, but only when at least one of steam and water is injected into the connection line 26, the bypass line 6 is closed and the compressor high-pressure stage 24 is used, so that it is possible to increase the power generation end output while suppressing surging in the compressor 16.

In addition, by supplying water from the outlet of the economizer 68 (the above-described high-temperature feed water) to the connection line 26, the supply amount of heated water is increased without being subject to the constraints of the pinch temperature of the evaporator 72, and the power generation end output can be increased.

In the configuration illustrated in FIG. 10, the control device 15 increases the power generation end output by controlling the adjustment devices 114, 118, and 120 to increase the supply amount to the compressed air line in order of the superheated steam, the high-temperature feed water, and the low-temperature feed water. Here, the enthalpy of the high-temperature feed water is higher than the enthalpy of the low-temperature feed water, and the enthalpy of the superheated steam is higher than the enthalpy of the high-temperature feed water. Thus, the control device 15 increases the power generation end output by controlling the adjustment devices 114, 118, and 120 to increase the amount of water or steam to be supplied to the connection line 26 in order from water or steam with relatively higher enthalpy, among water or steam from the low-temperature feed water line 104, the high-temperature feed water line 106, and the superheated-steam line 108.

As described above, by preferentially injecting steam or water with high enthalpy into the connection line 26, it is possible to increase the power supply amount and the heat supply amount while suppressing the increase in fuel consumption.

In some embodiments, for example, in the gas turbine plant 2 (2C), the control device 15 may be configured to increase the total output of the output of the turbine 20 and the outputs of the steam turbines 96 and 98 (the total output of the generators 21, 102, and 103), by increasing the amount of water or steam to be supplied to the connection line 26 in order from water or steam with relatively higher enthalpy, among steam or water from the low-temperature feed water line 104, the high-temperature feed water line 106, and the superheated-steam line 108.

Figure 12:
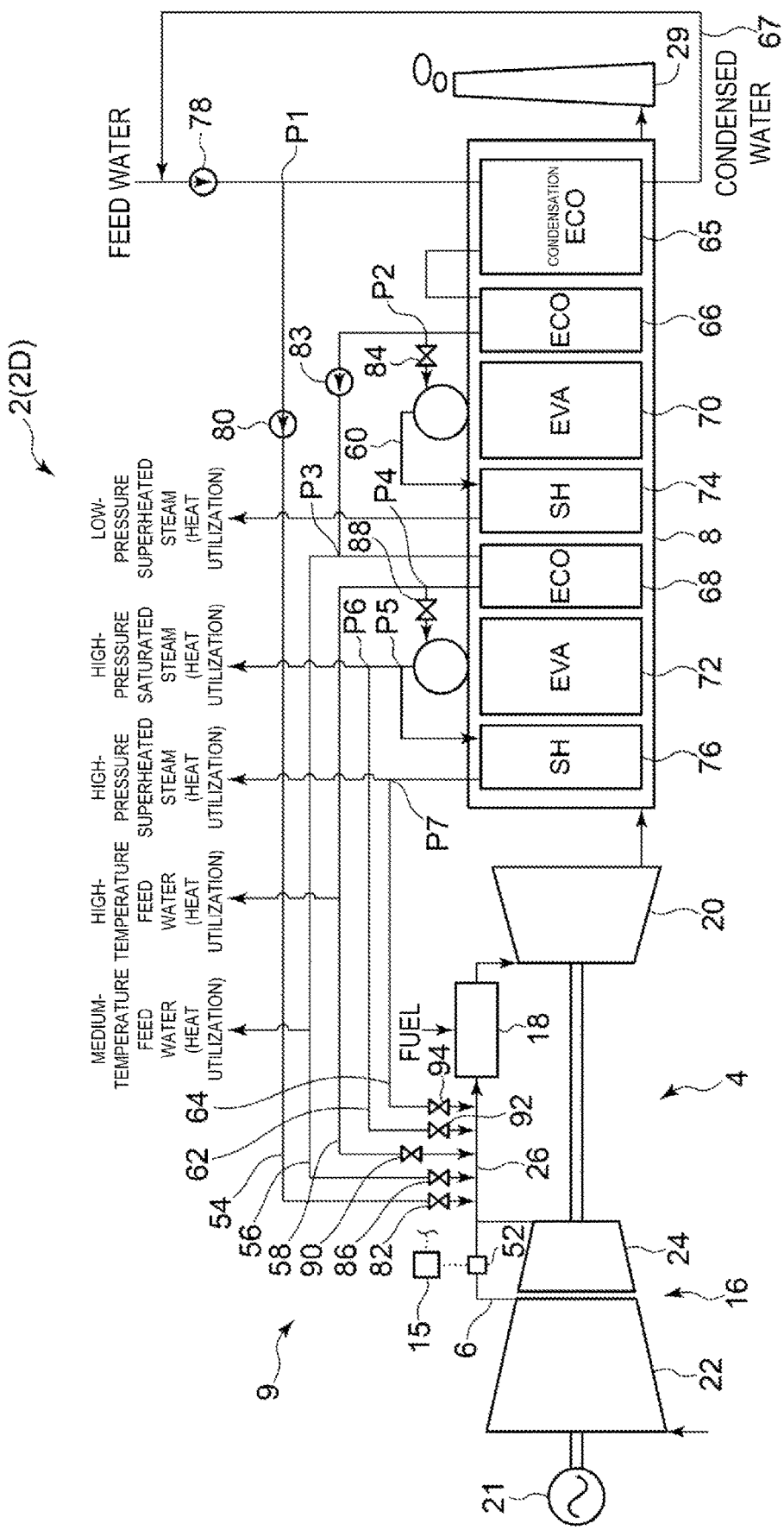
FIG. 12 is a diagram illustrating a schematic configuration of a gas turbine plant 2 (2D) according to an embodiment.

FIG. 12 is a diagram illustrating a schematic configuration of a gas turbine plant 2 (2D) according to an embodiment. In the configuration illustrated in FIG. 12, as described below, the configuration of the heat recovery steam generator 8 and the configuration of the low-temperature feed water line 54 are different from those illustrated in FIG. 7.

In the configuration illustrated in FIG. 12, the heat recovery steam generator 8 includes a condensation economizer 65 on the downstream side of the economizer 66 in the flow direction of the exhaust gas of the turbine 20. The low-temperature feed water line 54 branches at a branching position P1 on the downstream side of the feed water pump 78, and is connected to the condensation economizer 65 and the connection line 26. As described above, the low-temperature feed water line 54 is configured such that water boosted by the feed water pump 78 can be supplied to the condensation economizer 65 and the connection line 26.

The low-temperature feed water supplied to the condensation economizer 65 from the low-temperature feed water line 54 is heated by heat exchange with the exhaust gas of the turbine 20 by the condensation economizer 65, and then supplied to the economizer 66. The exhaust gas of the turbine 20 is cooled and condensed by heat exchange with low-temperature feed water in the condensation economizer 65 to generate condensed water. This condensed water is supplied to the low-temperature feed water line 54 via the condensed water line 67.

In a typical gas turbine, the concentration of water vapor in the exhaust gas (mole fraction) is 10% or less, and the dew point temperature is approximately 45° C.

Figure 13:
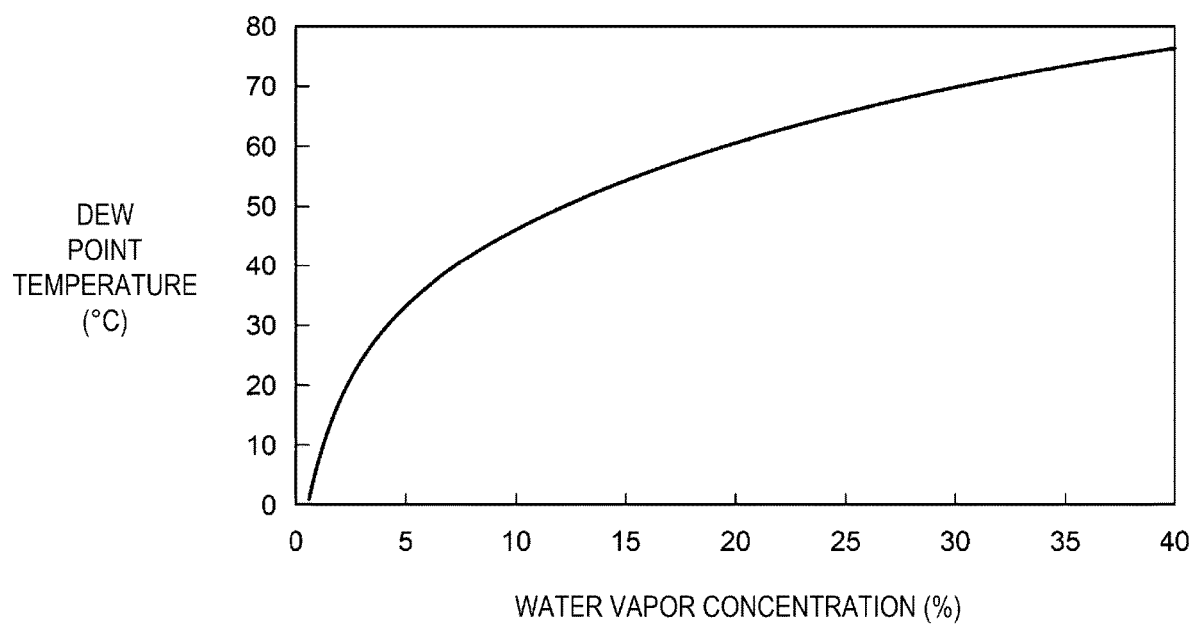
FIG. 13 is a diagram illustrating a relationship between water vapor concentration and dew point temperature.

In this regard, in the gas turbine plant 2 (2A to 2D) described above, when at least one of steam or water is supplied to the connection line 26, the concentration of water vapor in the exhaust gas of the turbine 20 may reach approximately 35%. In this case, as illustrated in FIG. 13, the dew point temperature is approximately 70° C. and the water vapor is easily condensed.

Thus, as in the gas turbine plant 2 (2D), when the condensation economizer 65 is provided and moisture in the exhaust gas is condensed, it is possible to significantly increase the amount of latent heat recovered from water vapor, compared to a case where a condensation economizer is provided in the gas turbine plant in the related art. Further, in the gas turbine plant 2 (2D), condensed water is recovered through the condensed water line 67 and is used as low-temperature feed water, so that it is possible to suppress an increase in the consumption of water for injecting steam or water.

In addition, the gas turbine plant 2 (2D) is an example in which the condensation economizer 65 is provided separately from the economizer 66. With such a configuration, it is possible to obtain good corrosion resistance without using expensive materials for the entire economizer 66, for example, by configuring only a condensation unit with a material having high corrosion resistance. In addition, by treating the condensation economizer 65 part as a consumable item and replacing only the condensation economizer 65 part regularly, it is possible to suppress troubles due to corrosion such as blowout of a heat transfer tube at a relatively low cost. However, in other embodiments, from the perspective of simplifying the configuration of the heat recovery steam generator 8, the economizer 66 and the condensation economizer 65 may be integrally configured.

Figure 14:
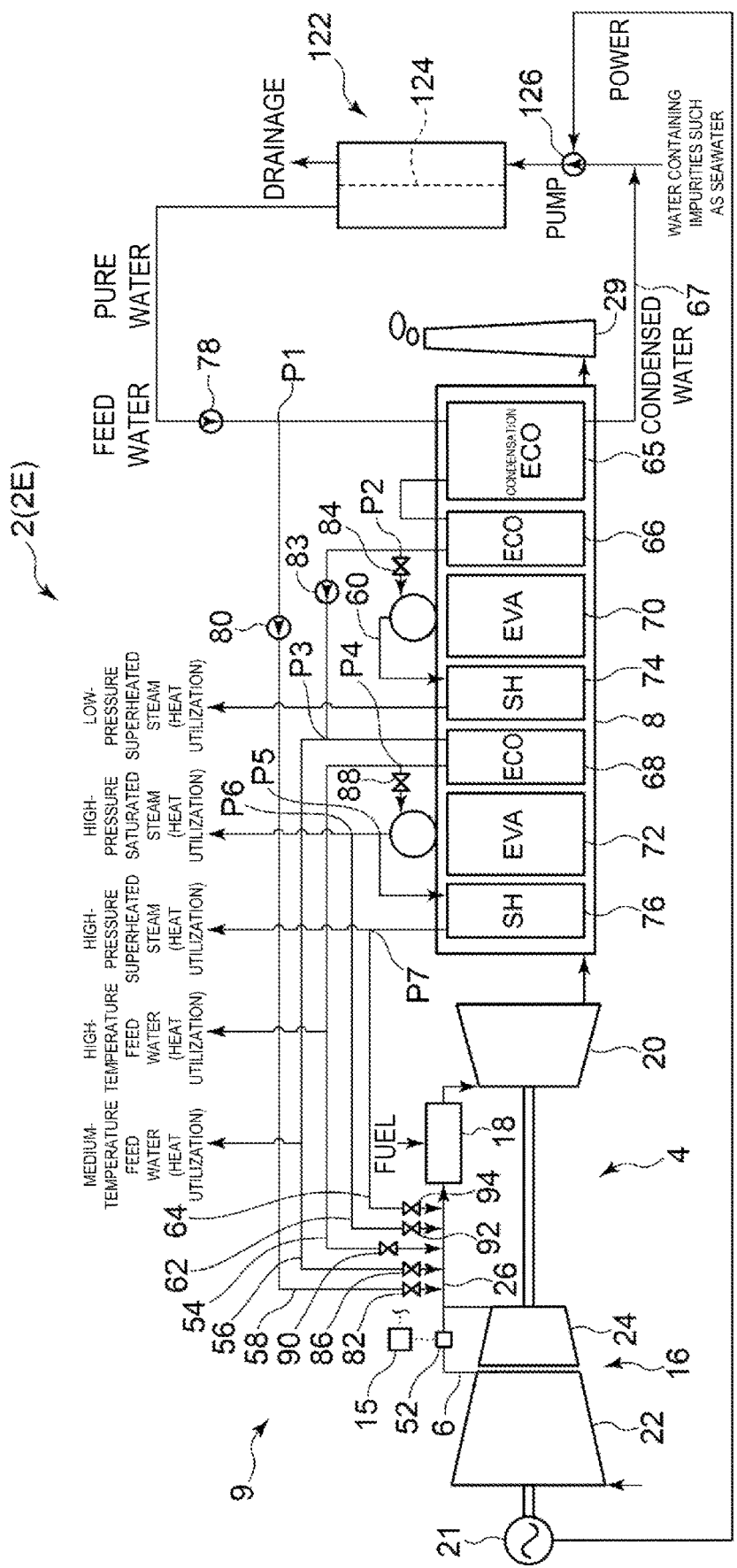
FIG. 14 is a diagram illustrating a schematic configuration of a gas turbine plant 2 (2E) according to an embodiment.
Figure 15:
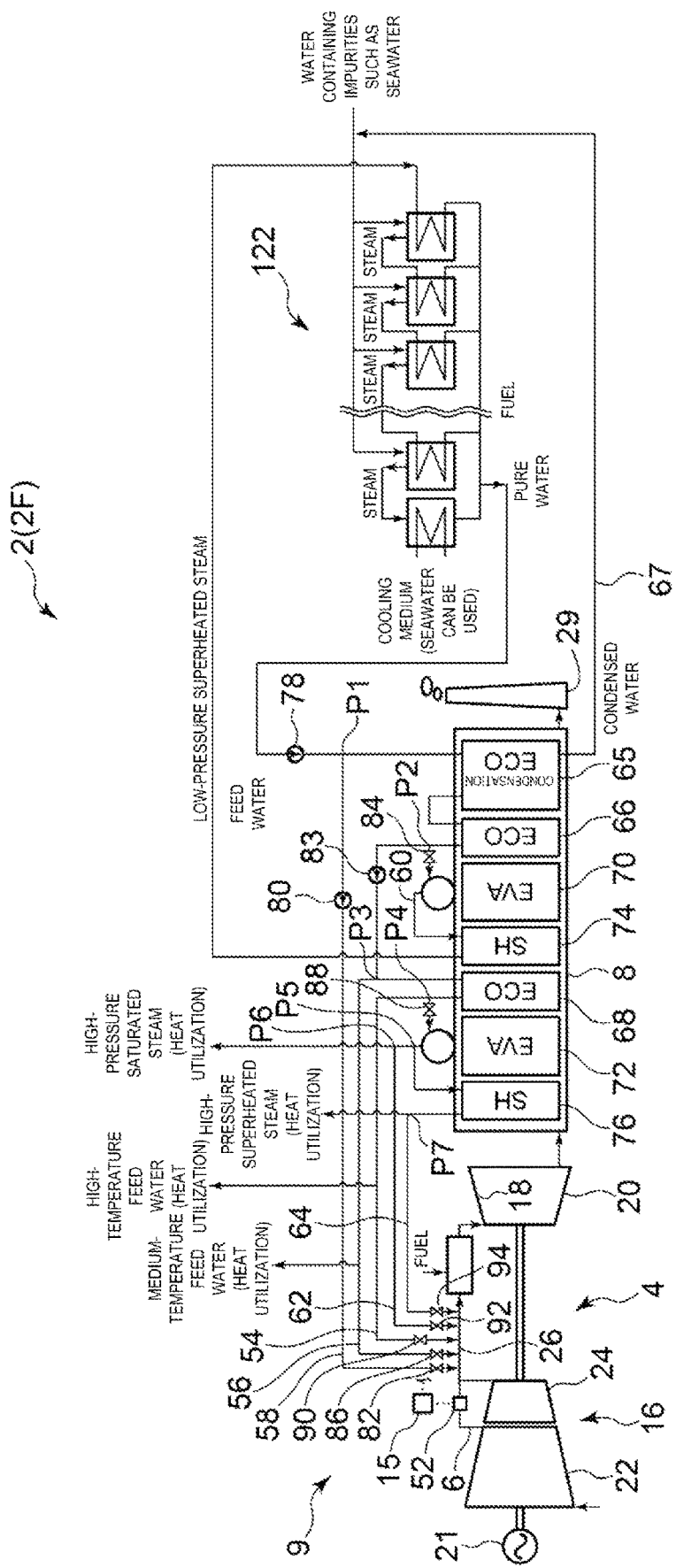
FIG. 15 is a diagram illustrating a schematic configuration of a gas turbine plant 2 (2F) according to an embodiment.

FIG. 14 is a diagram illustrating a schematic configuration of a gas turbine plant 2 (2E) according to an embodiment. FIG. 15 is a diagram illustrating a schematic configuration of a gas turbine plant 2 (2F) according to an embodiment. Some embodiments illustrated in FIGS. 14 and 15 are different from the configuration illustrated in FIG. 12 in that a desalination device 122 (pure water production device) is provided to remove impurities from the condensed water line 67.

The desalination device 122 may be configured to remove impurities in the condensed water flowing through the condensed water line 67 by, for example, a reverse osmosis membrane 124 as illustrated in FIG. 14, may be configured to remove impurities by using Multi Effect Desalination (MED) as illustrated in FIG. 15, or may be configured to remove impurities by using other known methods such as ultrasonic atomization separation or Multi-Stage Flash (MSF). Fresh water (pure water) produced by the desalination device 122 flows into the low-temperature feed water line 54 via a fresh water line 69, and is supplied to the connection line 26 or the condensation economizer 65 via the low-temperature feed water line 54.

As illustrated in FIGS. 14 and 15, the desalination device 122 may be configured to produce fresh water by using the condensed water and water containing impurities such as seawater. In the configuration illustrated in FIG. 14, the power generated by the generator 21 may be used to drive a pump 126 configured to generate front-rear differential pressure of the reverse osmosis membrane 124. Further, in the configuration illustrated in FIG. 15, the desalination device 122 that uses multi effect desalination may be driven by the steam generated by the heat recovery steam generator 8.

Note that, in the gas turbine plant 2 (2A to 2F) described with reference to FIGS. 1 to 15, a configuration has been illustrated in which steam or water is injected to a position between the outlet of the compressor high-pressure stage 24 and the inlet of the combustor 18 in the connection line 26 of the gas turbine 4, but in each embodiment, the position to which steam or water is injected may be any position between the outlet of the compressor high-pressure stage 24 and the inlet of the turbine 20 in the connection line 26 of the gas turbine 4.

Figure 16:
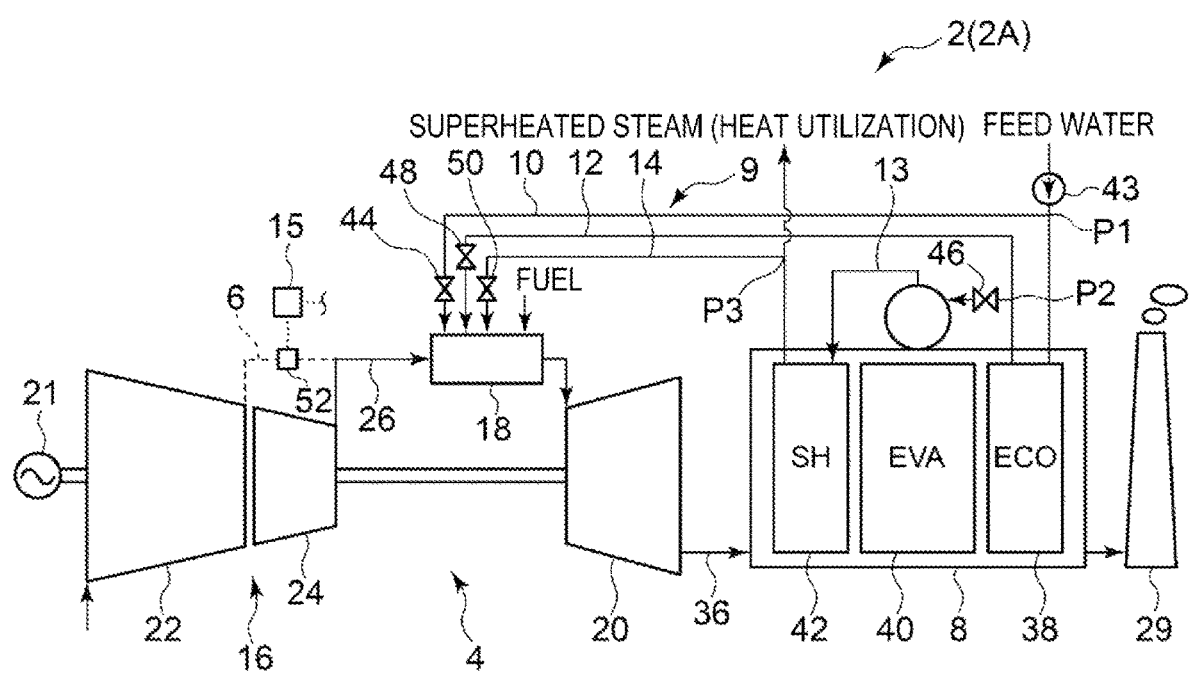
FIG. 16 is a diagram illustrating a modified example of the gas turbine plant 2 (2A) according to the embodiment.
Figure 17:
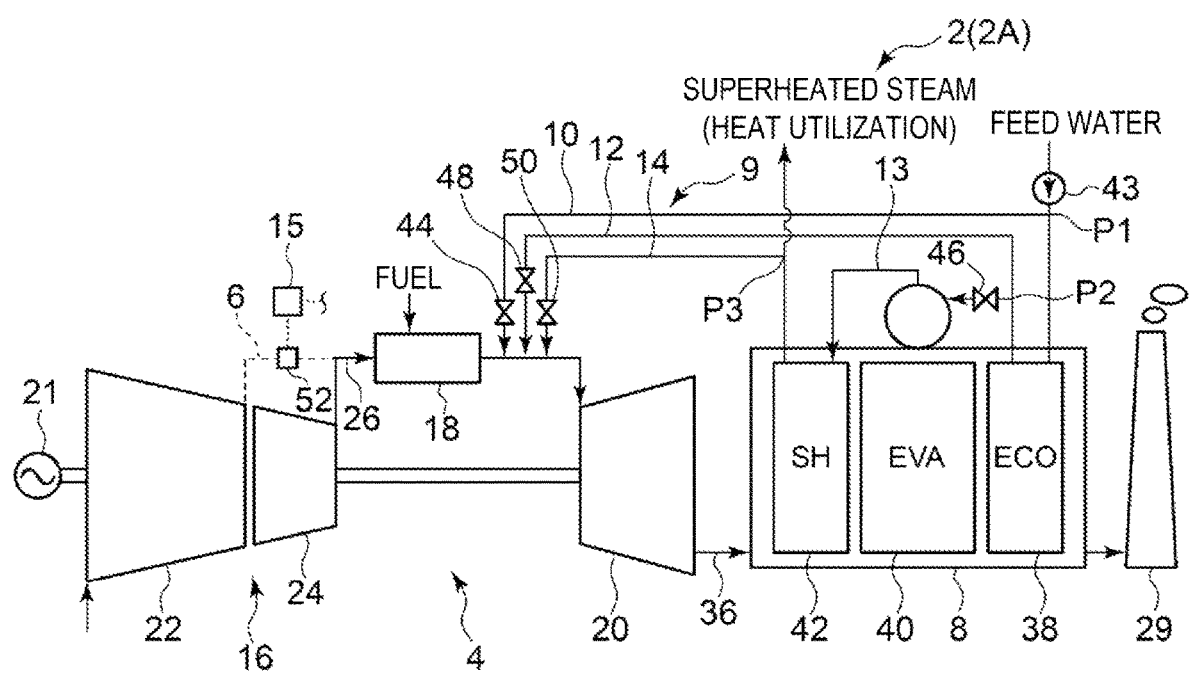
FIG. 17 is a diagram illustrating another modified example of the gas turbine plant 2 (2A) according to the embodiment.

For example, the low-temperature feed water line 10, the high-temperature feed water line 12, and the superheated-steam line 14 in the gas turbine plant 2 (2A) described above may be connected to the combustor 18 as illustrated in FIG. 16, and low-temperature feed water, high-temperature feed water, and superheated steam may be injected into the combustor 18. Alternatively, for example, the low-temperature feed water line 10, the high-temperature feed water line 12, and the superheated-steam line 14 in the gas turbine plant 2 (2A) described above are connected to a position between the outlet of the combustor 18 and the inlet of the turbine 20 in the connection line 26 as illustrated in FIG. 17, and low-temperature feed water, high-temperature feed water, and superheated steam may be injected into the position between the outlet of the combustor 18 and the inlet of the turbine 20 in the connection line 26.

Figure 18:
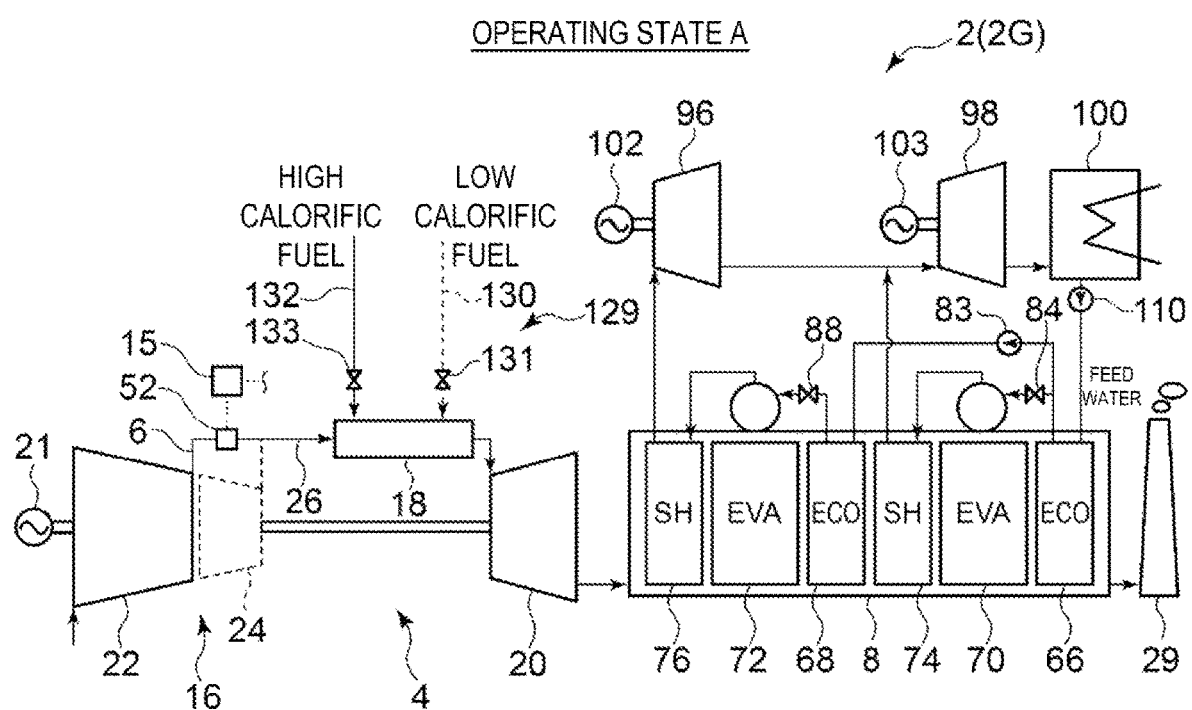
FIG. 18 is a diagram illustrating a schematic configuration of a gas turbine plant 2 (2G) according to an embodiment.

FIG. 18 is a diagram illustrating a schematic configuration of a gas turbine plant 2 (2G) according to an embodiment.

The configuration illustrated in FIG. 18 is different from the configuration illustrated in FIG. 10 in that a low calorific fuel line 130 as a first fuel line and a high calorific fuel line 132 as a second fuel line are provided, neither steam nor water is supplied from the heat recovery steam generator 8 to the gas turbine 4, and the control contents of the control device 15 are different.

In the configuration illustrated in FIG. 18, the gas turbine plant 2 (2G) is configured as a combined cycle power generation plant, as described below.

As illustrated in FIG. 18, the gas turbine plant 2 (2G) is provided with the gas turbine 4, the bypass line 6, the heat recovery steam generator 8, the control device 15, the high-pressure steam turbine 96, the low-pressure steam turbine 98, the condenser 100, and the generators 21, 102, and 103.

The gas turbine 4 includes the compressor 16, the combustor 18 configured to mix and combust the air compressed by the compressor 16 with fuel, and the turbine 20 configured to be driven by the combustion gas generated by the combustor 18. Further, the generator 21 is connected to the gas turbine 4.

The compressor 16 includes the compressor low-pressure stage 22 for compressing air and the compressor high-pressure stage 24 for further compress the air compressed at the compressor low-pressure stage 22. The outlet of the compressor high-pressure stage 24 (the outlet of the compressed air) and the inlet of the turbine 20 (the inlet of the combustion gas supplied from the combustor 18) are connected via the connection line 26, and the combustor 18 is provided on the connection line 26. In other words, the connection line 26 connects the outlet of the compressor high-pressure stage 24 and the inlet of the turbine 20 via the combustor 18. The compressed air compressed at the compressor high-pressure stage 24 flows into the combustor 18 through the connection line 26, and the combustion gas generated by the combustor 18 flows into the turbine 20 through the connection line 26.

The bypass line 6 is configured such that a part or all of the air compressed in the compressor low-pressure stage 22 bypasses the compressor high-pressure stage 24 and can be supplied to between the outlet of the compressor high-pressure stage 24 and the inlet of the turbine 20, that is, to the connection line 26. The bypass line 6 is provided with the adjustment device 52 configured to adjust the flow rate of the air flowing through the bypass line 6. The adjustment device 52 may be, for example, a valve used for freely adjusting the degree of opening, may be an on-off valve used for switching between a fully open state and a fully closed state, or may have other configurations described later. Note that the outlet of the compressor high-pressure stage 24 refers to the position of the trailing edge of the stator vane located on the most downstream side of the plurality of stator vanes (not illustrated) provided in the compressor 16, and the inlet of the turbine 20, more specifically, refers to the position of the leading edge of the stator vane located on the most upstream side among the plurality of stator vanes (not illustrated) provided in the turbine 20.

In the illustrated exemplary configuration, the bypass line 6 is configured to connect the outlet of the compressor low-pressure stage 22 (the outlet of the compressed air) to an intermediate position of the connection line 26. When the air compressed at the compressor low-pressure stage 22 flows into the bypass line 6, the air bypasses the compressor high-pressure stage 24, flows into the connection line 26, and is supplied to the combustor 18.

The heat recovery steam generator (HRSG) 8 is connected to the outlet of the turbine 20 (the outlet of the exhaust gas) via the exhaust gas line 36, and is configured to heat water and steam using the heat of the exhaust gas of the turbine 20.

The heat recovery steam generator 8 of the gas turbine plant 2 (2G) illustrated in FIG. 18 includes the economizers 66 and 68, the evaporators 70 and 72, and the superheaters 74 and 76. The economizer 66, the evaporator 70, the superheater 74, the economizer 68, the evaporator 72, and the superheater 76 are disposed in the heat recovery steam generator 8 in order from the downstream side in the flow direction of the exhaust gas of the turbine.

In the configuration illustrated in FIG. 18, water condensed by the condenser 100 (low-temperature feed water) is supplied to the economizer 66 by the feed water pump 110. Water supplied to the economizer 66 is heated by the exhaust gas of the turbine 20 in the economizer 66, and then supplied to the evaporator 70 and the economizer 68. The water supplied to the evaporator 70 is heated by the exhaust gas of the turbine 20 by the evaporator 70 to become saturated steam, and is supplied to the superheater 74. The steam supplied to the superheater 74 is superheated by the exhaust gas of the turbine 20 by the superheater 74 to become superheated steam, and then supplied to the low-pressure steam turbine 98 to drive the low-pressure steam turbine 98. The generator 103 is connected to the low-pressure steam turbine 98.

Water (high-temperature feed water) heated by the economizer 68 is supplied to the evaporator 72. The high-temperature feed water supplied to the evaporator 72 is heated by the exhaust gas of the turbine 20 by the evaporator 72 to become saturated steam, and is supplied to the superheater 76. The steam supplied to the superheater 76 is superheated by the exhaust gas of the turbine 20 by the superheater 76 to become superheated steam, and then supplied to the high-pressure steam turbine 96 to drive the high-pressure steam turbine 96. The generator 102 is connected to the high-pressure steam turbine 96.

The low calorific fuel line 130 is configured to be able to supply of low calorific fuel (first fuel) to the combustor 18. The low calorific fuel may be, for example, blast furnace gas, biomass gas, coal gasification gas, or ammonia decomposition gas. The low calorific fuel line 130 is provided with an adjustment device 131 configured to adjust the flow rate of the low calorific fuel flowing through the low calorific fuel line 130.

The high calorific fuel line 132 is configured to be able to supply of high calorific fuel (second fuel) having a higher calorific value than the low calorific fuel to the combustor 18. The high calorific fuel may be, for example, natural gas, petroleum gas, or the like. The high calorific fuel line 132 is provided with an adjustment device 133 configured to adjust the flow rate of the high calorific fuel flowing through the high calorific fuel line 132. As described above, in the gas turbine plant 2 (2G), the low calorific fuel line 130, the high calorific fuel line 132, and the adjustment devices 131 and 133 constitute the fuel supply device 129 for supplying the low calorific fuel and the high calorific fuel to the combustor 18.

In the gas turbine plant 2 (2G) illustrated in FIG. 18, the control device 15 controls at least the adjustment devices 52, 131, and 132 to switch the operating state. Note that the control device 15 may be an electrical circuit or a computer. When the control device 15 is a computer, the control device 15 includes storage devices such as a Random Access Memory (RAM) and a Read Only Memory (ROM), and processors such as a Central Processing Unit (CPU) and a Graphics Processing Unit (GPU), and the functions are implemented by the processors executing programs stored in the storage devices.

Figure 19:
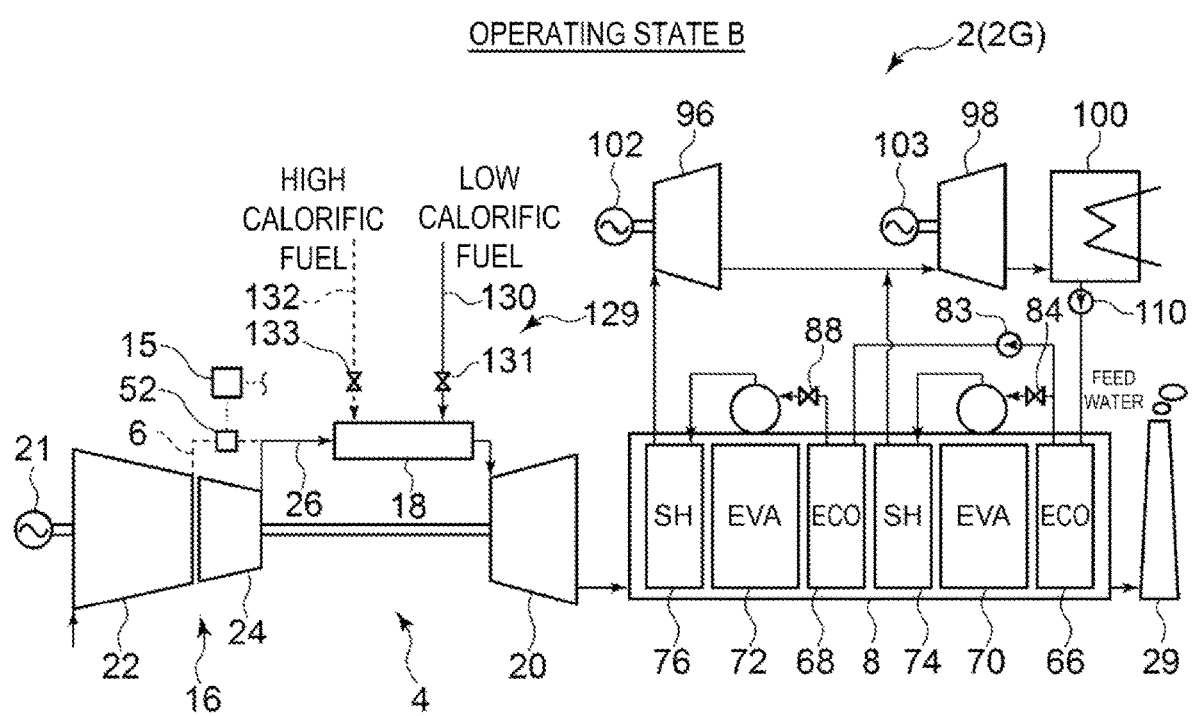
FIG. 19 illustrates an operating state of the gas turbine plant 2 (2G) that is different from the state in FIG. 18.

FIG. 19 illustrates an operating state of the gas turbine plant 2 (2G) different a state in FIG. 18. With respect to lines 6, 26, 130, and 132 illustrated in FIGS. 18 and 19, when each line is indicated by a solid line, it indicates a state in which each line is open and fluid is flowing, and when each line is indicated by a dotted line, it indicates a state in which each line is closed and fluid is not flowing. In the gas turbine plant 2 (2G), as described below, when a high calorific fuel is used, the bypass line 6 is opened; and when a low calorific fuel is used, the bypass line 6 is closed and a compressor high-pressure stage 24 is used.

In the operating state A illustrated in FIG. 18, the adjustment device 131 is closed and the adjustment devices 52 and 132 are open. Thus, in the operating state A, the low calorific fuel is not supplied to the combustor 18 from the low calorific fuel line 130, and the high calorific fuel is supplied to the combustor 18 from the high calorific fuel line 132. In addition, in the operating state A, the adjustment device 52 is open, so that a portion of the air compressed in the compressor low-pressure stage 22 bypasses the compressor high-pressure stage 24, passes through the bypass line 6, and is supplied to the combustor 18. As described above, when the high calorific fuel is supplied to the combustor 18 by the high calorific fuel line 132, the bypass line 6 is closed by the adjustment device 52.

In the operating state B illustrated in FIG. 19, the adjustment devices 52 and 132 are closed and the adjustment device 131 is open. Thus, in the operating state B, the high calorific fuel is not supplied to the combustor 18 from the high calorific fuel line 132, and the low calorific fuel is supplied to the combustor 18 from the low calorific fuel line 130. In addition, in the operating state B, because the adjustment device 52 is closed, air compressed at the compressor low-pressure stage 22 is supplied to the combustor 18 through the compressor high-pressure stage 24 without flowing into the bypass line 6. As described above, when the low calorific fuel is supplied to the combustor 18 by the low calorific fuel line 130, the bypass line 6 is opened by the adjustment device 52.

In the gas turbine plant 2 (2G), in order to obtain an appropriate calorific value for combustion in the combustor 18, the control device 15 controls the adjustment devices 131 and 133 such that the flow rate (volumetric flow rate) of the low calorific fuel in the operating state B is greater than the flow rate (volumetric flow rate) of the high calorific fuel in the operating state A.

Therefore, in the operating state A in which the flow rate of the fuel supplied to the combustor 18 is small, an increase in the pressure at the outlet of the compressor high-pressure stage 24 caused by the flow rate of the fuel is suppressed, so that surging in the compressor 16 can be suppressed even when the bypass line 6 is opened.

Further, in the operating state B in which the flow rate of the fuel supplied to the combustor 18 is high, the increase in the pressure at the outlet of the compressor high-pressure stage 24 caused by the flow rate of the fuel increases, so that surging in the compressor 16 can be suppressed by using the compressor high-pressure stage 24 by closing the bypass line 6.

Thus, even when any one of the low calorific fuel and the high calorific fuel is used in the combustor, surging in the compressor 16 can be effectively suppressed.

Next, some configuration examples of the bypass line 6 will be described.

Figure 20:
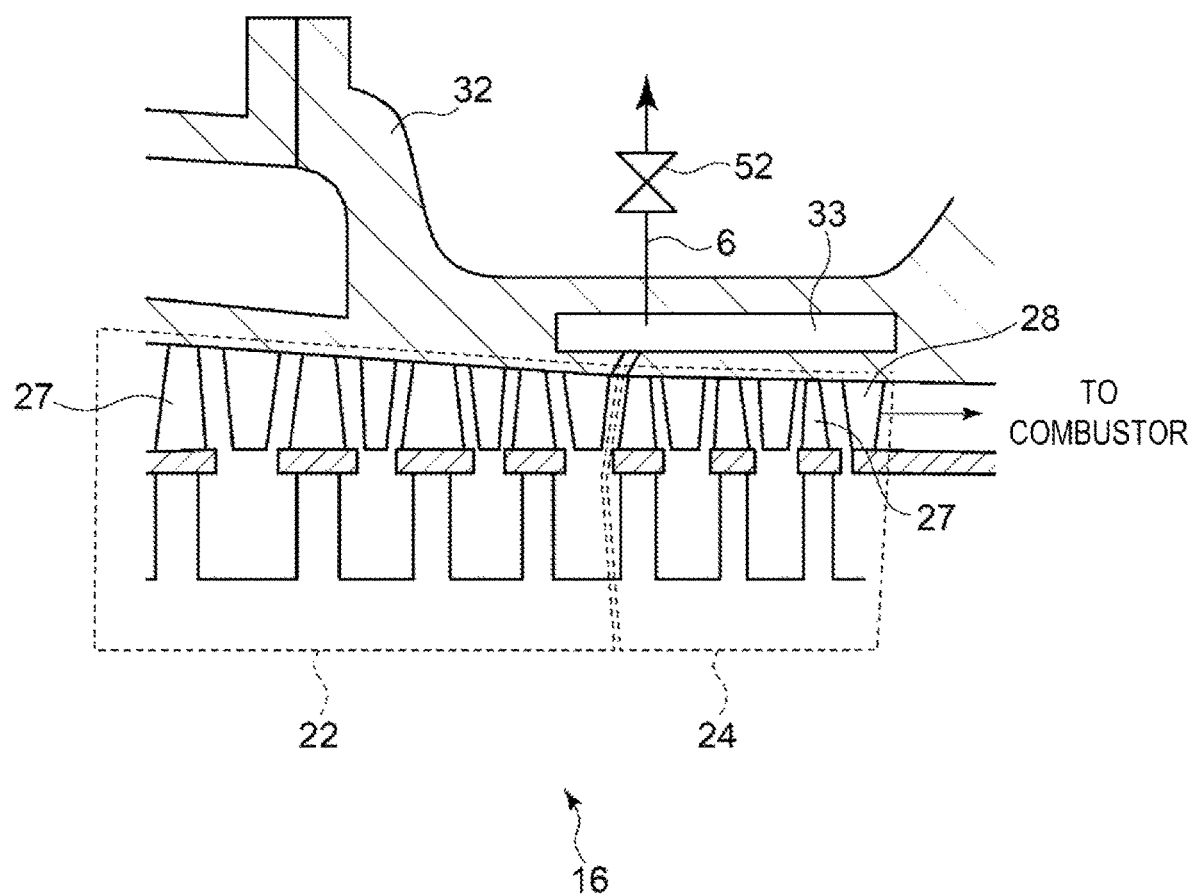
FIG. 20 is a partial cross-sectional view for explaining a configuration in which at least a part of a bypass line 6 is provided outside a casing 32 of a compressor 16.

In some embodiments, as illustrated in FIG. 20, for example, at least a portion of the bypass line 6 may be provided outside the casing 32 of the compressor 16. In this case, one end of the bypass line 6 is connected to the air extraction port 33 provided in the casing 32, and the other end of the bypass line 6 is connected to any position of the connection lines 26.

Figure 21:
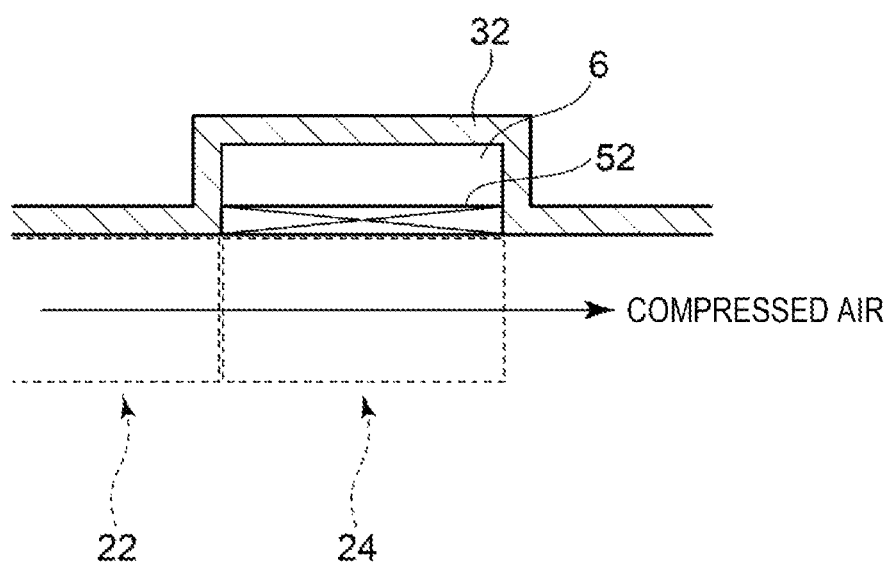
FIG. 21 is a partial cross-sectional view for explaining a configuration in which the bypass line 6 is provided inside the casing 32 of the compressor 16, and illustrates a state in which an adjustment device 52 is closed.
Figure 22:
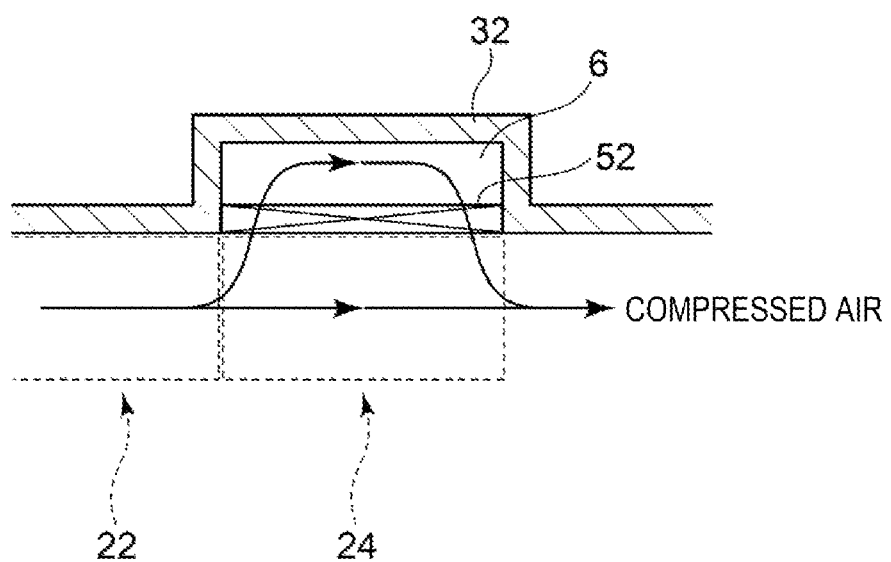
FIG. 22 is a partial cross-sectional view for explaining a configuration in which the bypass line 6 is provided inside the casing 32 of the compressor 16, and illustrates a state in which the adjustment device 52 is open.

In some embodiments, as illustrated in FIGS. 21 and 22, for example, the bypass line 6 may be provided inside the casing 32 of the compressor 16. In this case, by adjusting the communication state between the bypass line 6 and the compressor high-pressure stage 24 by the adjustment device 52 provided inside the casing 32, an operating state (see FIG. 21) in which air compressed by the compressor low-pressure stage 22 is further compressed by the compressor high-pressure stage 24 without flowing into the bypass line 6, and an operating state (see FIG. 22) in which a part of air compressed by the compressor low-pressure stage 22 flows into the bypass line 6 and bypasses the compressor high-pressure stage 24 are switched.

When the bypass line 6 is provided inside the casing 32 of the compressor 16 as illustrated in FIGS. 21 and 22, the adjustment device 52 may employ the configuration of FIGS. 23 to 26 below, for example.

Figure 23:
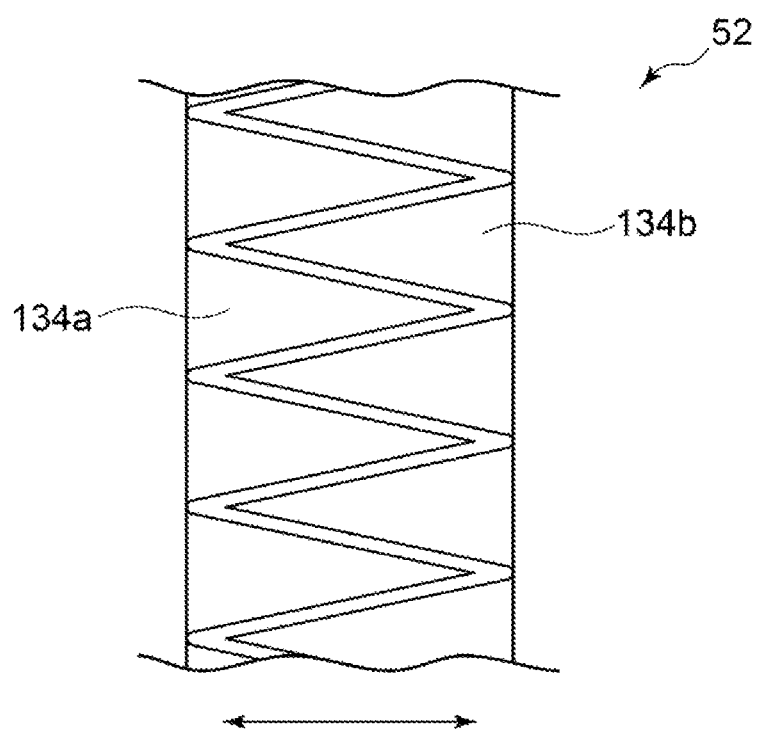
FIG. 23 is a diagram illustrating an example of a configuration of the adjustment device 52.

In the configuration illustrated in FIG. 23, the adjustment device 52 includes a pair of comb tooth structure portions 134a and 134b, and teeth of one comb tooth structure portion 134a and teeth of the other comb tooth structure portion 134b are alternately arranged. In such a configuration, by adjusting the distance between one comb tooth structure portion 134a and the other comb tooth structure portion 134b, it is possible to adjust the communication state between the bypass line 6 and the compressor high-pressure stage 24 as illustrated in FIGS. 21 and 22.

Figure 24:
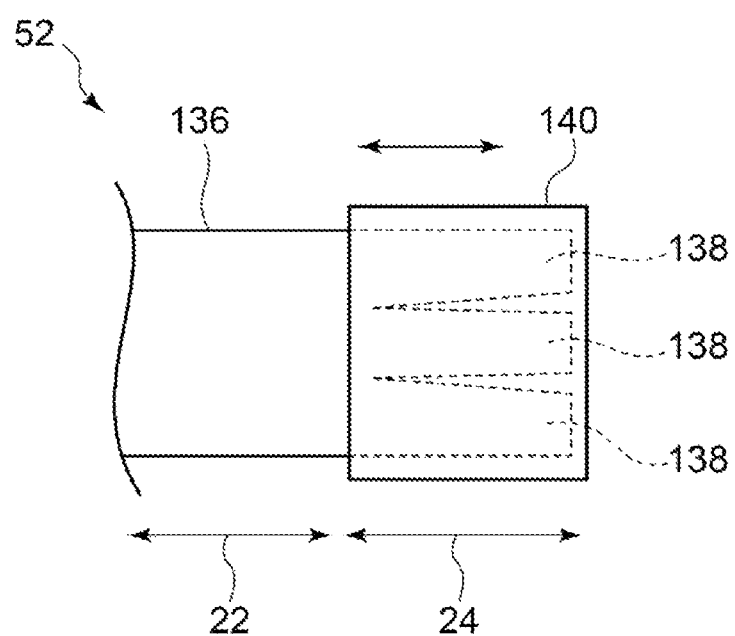
FIG. 24 is a diagram illustrating another example of the configuration of the adjustment device 52.

In the configuration illustrated in FIG. 24, the adjustment device 52 includes a cylindrical portion 136, a plurality of circumferential wall portions 138 provided at intervals in the circumferential direction on one end side of the cylindrical portion, and a cylindrical portion 140 disposed on the outer circumferential side of the circumferential wall portion 138 and movable in an axial direction. In such a configuration, since the gap between the plurality of circumferential wall portions 138 is opened and closed by the cylindrical portion 140 moving in the axial direction, it is possible to adjust the communication state between the bypass line 6 and the compressor high-pressure stage 24 as illustrated in FIGS. 21 and 22.

Figure 25:
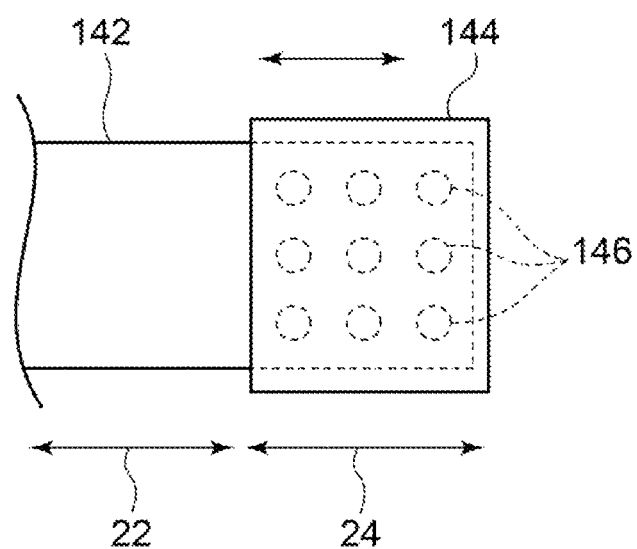
FIG. 25 is a diagram illustrating another example of the configuration of the adjustment device 52.

In the configuration illustrated in FIG. 25, the adjustment device 52 includes a cylindrical portion 142, and a cylindrical portion 144 disposed on the outer circumferential side of the cylindrical portion 142. A plurality of through-holes 146 are formed in an axial direction range corresponding to the compressor high-pressure stage 24 of the cylindrical portion 142. In such a configuration, by the cylindrical portion 144 moving in the axial direction between a position where the plurality of through-holes 146 are covered and a position where the plurality of through-holes 146 are not covered, the communication state between the bypass line 6 and the compressor high-pressure stage 24 can be adjusted as illustrated in FIGS. 21 and 22.

Figure 26:
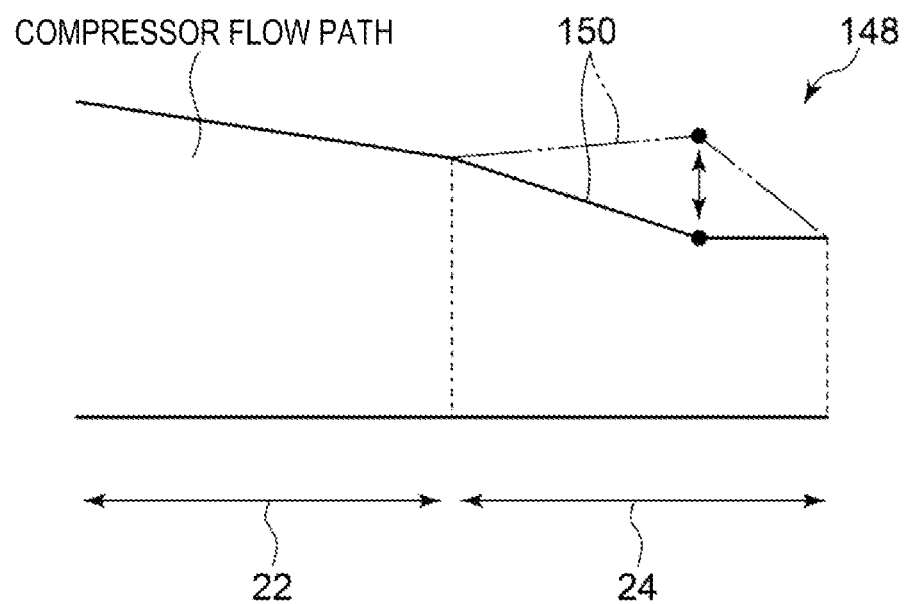
FIG. 26 is a diagram illustrating another example of the configuration of the adjustment device 52.

In the configuration illustrated in FIG. 26, the adjustment device 52 can adjust the communication state between the bypass line 6 and the compressor high-pressure stage 24 as illustrated in FIGS. 21 and 22, by moving the plate 150 by using the hinge structure 148 to expand or reduce the volume of the space inside the plate 150.

The present disclosure is not limited to the embodiments described above and also includes a modification of the above-described embodiments as well as appropriate combinations of these modes.

Figure 27:
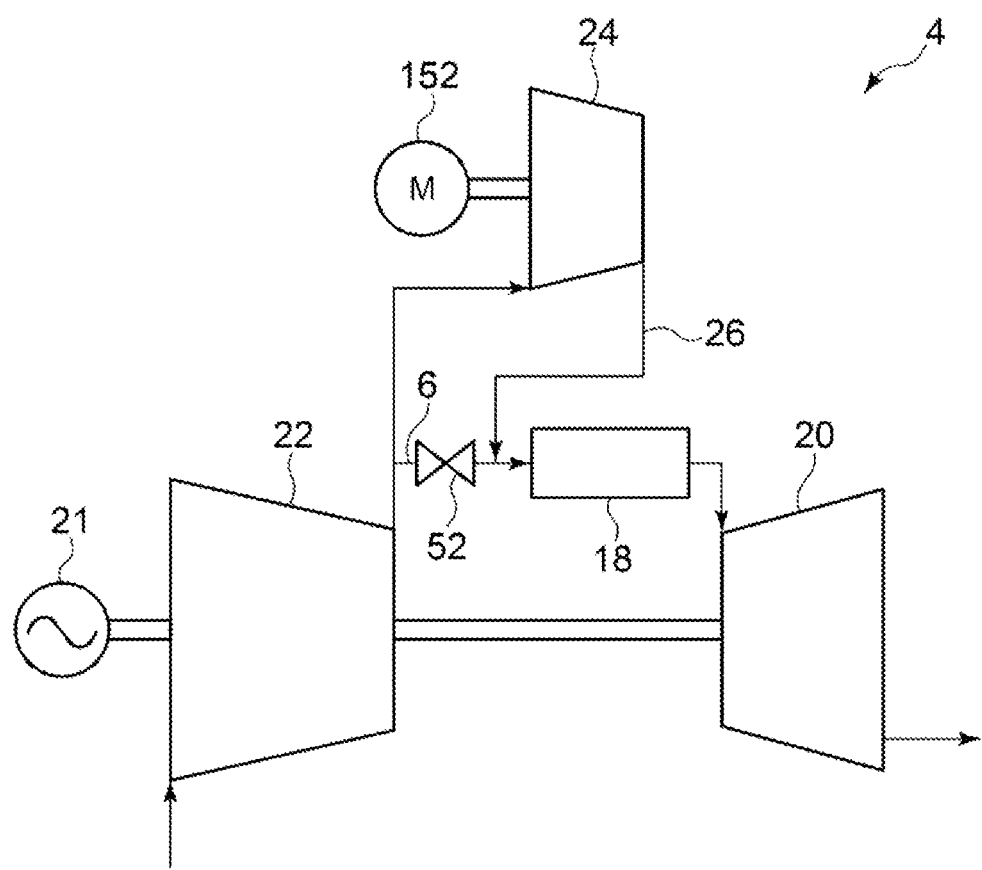
FIG. 27 is a diagram illustrating a configuration of a gas turbine 4 in a case where a compressor low-pressure stage 22 and a compressor high-pressure stage 24 are provided on different shafts.

For example, in some embodiments described above, the gas turbine 4 is illustrated in which the compressor low-pressure stage 22 and the compressor high-pressure stage 24 are provided coaxially. However, as illustrated in FIG. 27, the compressor low-pressure stage 22 and the compressor high-pressure stage 24 of the gas turbine 4 may be provided on separate axes. In the configuration illustrated in FIG. 27, a motor 152 that drives the compressor high-pressure stage 24 is provided.

Figure 28:
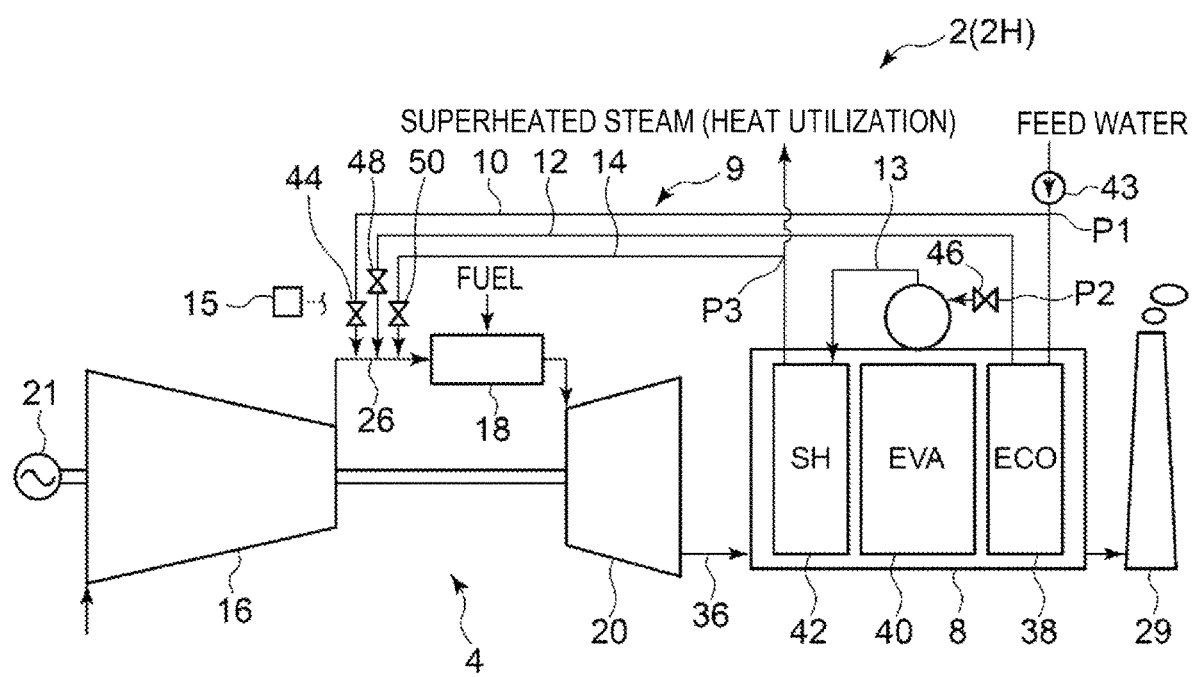
FIG. 28 is a diagram illustrating a schematic configuration of a gas turbine plant 2 (2H) according to an embodiment.

Further, in some embodiments described above, a configuration including the bypass line 6 is illustrated, but the bypass line 6 may not be provided, for example, as illustrated in FIG. 28. In this case, the control device 15 performs the control described using FIGS. 8 and 9.

Figure 29:
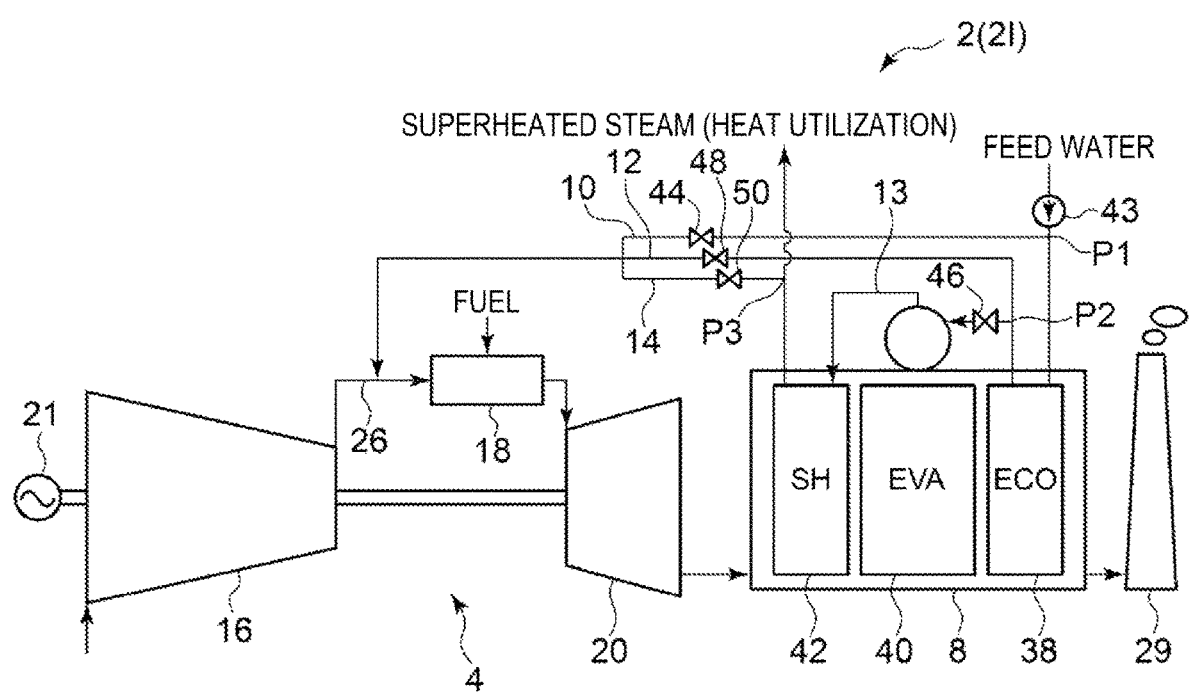
FIG. 29 is a diagram illustrating a schematic configuration of a gas turbine plant 2 (2I) according to an embodiment.

Further, in some embodiments described above, a configuration has been illustrated in which steam and water are separately injected from respective lines into the gas turbine 4. However, as illustrated in FIG. 29, for example, respective lines may be merged and the steam and water from respective lines may be mixed and then supplied to the gas turbine 4. In the configuration illustrated in FIG. 29, it is configured such that the low-temperature feed water line 10, the high-temperature feed water line 12, and the superheated-steam line 14 are merged on the downstream side of the adjustment devices 44, 48, and 50.

In addition, in the gas turbine plant 2 (2G) illustrated in FIGS. 18 and 19, the operation method has been described in which when a high calorific fuel is used, the bypass line 6 is opened, and when a low calorific fuel is used, the bypass line 6 is closed and the compressor high-pressure stage 24 is used.

However, the low calorific fuel and the high calorific fuel may be supplied to the combustor 18 at the same time. In this case, in the gas turbine plant 2 (2G), the control device 15 is configured to open the bypass line 6 by the adjustment device 52 when the calorific value (the calorific value when assuming that the low calorific fuel and the high calorific fuel are mixed) of the fuel supplied to the combustor 18 is higher than a threshold value, and close the bypass line 6 by the adjustment device 52 when the calorific value of the fuel supplied to the combustor 18 is lower than the threshold value. Further, similar to the configuration described using FIG. 29, the low calorific fuel and the high calorific fuel may be mixed and then supplied to the combustor 18.

In addition, in some embodiments, in the gas turbine plants 2 (2A to 2F, 2H, and 2I) described above, the control device 15 may be configured to open or close the bypass line 6 by the adjustment device 52, based on at least one of the supply amount of at least one of steam and water supplied to the connection line 26 by the supply device 9, the output of the turbine 20, and the pressure at the outlet of the compressor high-pressure stage 24.

The details described in each embodiment can be understood as follows, for example.

(1) A gas turbine plant according to the present disclosure (for example, the gas turbine plants 2 (2A to 2G) described above is a gas turbine plant including:

a compressor (for example, the compressor 16 described above) including a compressor low-pressure stage (for example, the compressor low-pressure stage 22 described above) for compressing air, and a compressor high-pressure stage (for example, the compressor high-pressure stage 24 described above) for further compressing the air compressed at the compressor low-pressure stage;

a combustor (for example, the combustor 18 described above) configured to mix and combust air compressed by the compressor with fuel;

a turbine (for example, the turbine 20 described above) configured to be driven by combustion gas generated in the combustor;

a connection line (for example, the connection line 26 described above) configured to connect an outlet of the compressor high-pressure stage and an inlet of the turbine via the combustor;

a bypass line (for example, bypass line 6 described above) configured to cause some or all of the air compressed at the compressor low-pressure stage to bypass the compressor high-pressure stage and to be supplied to the connection line; and an adjustment device (for example, the adjustment device 52 described above) configured to adjust a flow rate of the air flowing through the bypass line, in which a plurality of types of fluid (for example, at least two types of fluid among the low calorific fuel, the high calorific fuel, the various types of steam, and the various types of water described above) are supplied to the connection line in addition to the air compressed by the compressor, and during operation of the gas turbine plant, supply of at least one type of fluid of the plurality of types of fluid to the connection line can be stopped according to an operating state of the gas turbine plant.

According to the gas turbine plant described in (1) above, by stopping the supply of at least one type of fluid to the connection line according to the operating state of the gas turbine plant, an increase in pressure at the outlet of the compressor high-pressure stage caused by the volumetric flow rate of the fluid can be avoided, and surging in the compressor can be suppressed.

(2) In some embodiments, in the gas turbine plant described in (1), when the supply of at least one type of fluid of the plurality of types of fluid to the connection line is stopped, the bypass line is opened by the adjustment device.

According to the gas turbine plant described in (2) above, by opening the bypass line when stopping the supply of at least one type of fluid to the connection line, surging in the compressor can be suppressed while suppressing fluctuations in the volumetric flow rate of the inlet of the turbine.

(3) In some embodiments, the gas turbine plant described in (1) or (2) above, further including:

a fuel supply device (for example, the low calorific fuel line 130 and the high calorific fuel line 132 described above) configured to supply at least two types of fuels (for example, the low calorific fuel and the high calorific fuel described above) having different calorific values to the combustor, in which the plurality of types of fluid include the at least two types of fuels.

In order to generate the appropriate thermal energy by combustion in the combustor, the required fuel flow rate changes in accordance with the calorific value of the fuel. Thus, when supplying at least two types of fuel having different calorific values to the combustor as described in (3) above, the type of fuel used affects the pressure of the outlet of the compressor high-pressure stage. Even in such a case, surging in the compressor can be suppressed by opening or closing the bypass line appropriately by using the adjustment device.

(4) In some embodiments, the gas turbine plant described in (3), further including:

a control device (for example, the control device 15 described above) configured to control the adjustment device, in which the fuel supply device is configured to supply, to the combustor, a first fuel (for example, the high calorific fuel described above) and a second fuel (for example, the low calorific fuel described above) having a lower calorific value than the first fuel, as the two types of fuels, and the control device is configured to open the bypass line by using the adjustment device when the first fuel is supplied to the combustor by the fuel supply device, and close the bypass line by using the adjustment device when the second fuel is supplied to the combustor by the fuel supply device.

When the second fuel having a low calorific value is supplied to the combustor in order to generate the appropriate thermal energy by combustion in the combustor, it is necessary to increase the fuel flow rate compared to a case where the first fuel having a high calorific value is supplied to the combustor.

Therefore, when the first fuel is supplied to the combustor, an increase in the pressure at the outlet of the compressor high-pressure stage caused by the fuel flow rate is suppressed, so that surging in the compressor can be suppressed even when the bypass line is opened.

Further, when the second fuel is supplied to the combustor, an increase in the pressure at the outlet of the compressor high-pressure stage caused by the fuel flow rate increases, so that surging in the compressor can be suppressed by using the compressor high-pressure stage by closing the bypass line.

Therefore, according to the gas turbine plant described in (4) above, even when either a low calorific fuel or a high calorific fuel is used in a combustor, the surging in a compressor can be effectively suppressed.

(5) In some embodiments, the gas turbine plant described in (3) further including:

a control device (for example, the control device 15 described above) configured to control the adjustment device, in which the control device is configured to open the bypass line by using the adjustment device when a calorific value of the fuel supplied to the combustor by the fuel supply device is higher than a threshold value, and close the bypass line by using the adjustment device when the calorific value of the fuel supplied to the combustor by the fuel supply device is lower than the threshold value.

According to the gas turbine plant described in (5) above, fluctuation in the pressure at the outlet of the compressor high-pressure stage caused by the difference in the calorific value of the fuel can be suppressed.

(6) In some embodiments, the gas turbine plant described in (1) or (2) above further including:

a supply device (for example, the low-temperature feed water lines 10, 54, and 104, the medium-temperature feed water line 56, the high-temperature feed water lines 12, 58, and 106, the superheated-steam lines 14, and 108, the low-pressure superheated-steam line 60, the high-pressure saturated-steam line 62, and the high-pressure superheated-steam line 64) configured to supply at least one of steam and water to the connection line, in which the plurality of types of fluid include at least one of steam and water.

According to the gas turbine plant described in (6) above, the supply amount of at least one of the steam and the water to the connection line affects the pressure at the outlet of the compressor high-pressure stage. Even in such a case, surging in the compressor can be suppressed by opening or closing the bypass line appropriately by the adjustment device.

(7) In some embodiments, the gas turbine plant described in (6) further including:

a control device configured to control the adjustment device, in which the control device is configured to open the bypass line by using the adjustment device when neither steam nor water is supplied to the connection line by the supply device, and close the bypass line by using the adjustment device when at least one of steam and water is supplied to the connection line by the supply device.

According to the gas turbine plant described in (7) above, when neither steam nor water is supplied to the connection line, an increase in the pressure at the outlet of the compressor high-pressure stage caused by the flow rate of at least one of steam and water is suppressed, so that surging in the compressor can be suppressed even when the bypass line is opened.

Further, when at least one of steam and water is supplied to the connection line, an increase in the pressure at the outlet of the compressor high-pressure stage caused by the flow rate of at least one of steam and water increases, so that surging in the compressor can be suppressed by using the compressor high-pressure stage by closing the bypass line.

(8) In some embodiments, the gas turbine plant described in (6) further including:

a control device (for example, the control device 15 described above) configured to control the adjustment device, in which the control device is configured to open or close the bypass line by using the adjustment device, based on at least one of a supply amount of at least one of steam and water supplied to the connection line by the supply device, an output of the turbine, and a pressure at the outlet of the compressor high-pressure stage.

According to the gas turbine plant described in (8) above, it is possible to appropriately open or close the bypass line so as to suppress surging in the compressor, depending on the pressure at the outlet of the compressor high-pressure stage and the output of the turbine.

(9) A gas turbine plant according to the present disclosure includes:

a compressor (for example, the compressor 16 described above);

a combustor (for example, the combustor 18 described above) configured to mix and combust the air compressed by the compressor with fuel;

a turbine (for example, the turbine 20 described above) configured to be driven by combustion gas generated in the combustor;

a connection line (for example, the connection line 26 described above) configured to connect an outlet of the compressor and an inlet of the turbine via the combustor;

a plurality of supply lines (for example, the low-temperature feed water lines 10, 54, and 104, the medium-temperature feed water line 56, the high-temperature feed water lines 12, 58, and 106, the superheated-steam lines 14 and 108, the low-pressure superheated-steam line 60, the high-pressure saturated-steam line 62, and the high-pressure superheated-steam line 64 described above) configured to supply steam or water having different enthalpies to the connection line;

a plurality of adjustment devices (for example, the adjustment devices 44, 48, 50, 78, 82, 86, 90, 92, 94, 114, 118, and 120 and/or the feed water pumps 43, 80, 83, 110, 112 described above) provided in the plurality of supply lines, respectively, and configured to adjust an amount of steam or water to be supplied to the connection line; and a control device (for example, the control device 15 described above) configured to control the plurality of adjustment devices, in which the control device is configured to increase an output of the turbine by controlling the plurality of adjustment devices to increase a supply amount of steam or water to be supplied to the connection line in order from steam or water having relatively higher enthalpy, among steam or water in the plurality of supply lines.

According to the gas turbine plant described in (9) above, by preferentially supplying steam or water having high enthalpy to the connection line, it is possible to increase the power supply amount and the heat supply amount while suppressing an increase in fuel consumption.

(10) In some embodiments, the gas turbine plant described in (9) further including:

at least one generator (for example, the generators 21, 102, and 103 described above), in which the control device is configured to increase the supply amount of steam or water supplied to the connection line from the plurality of supply lines until any one of the following conditions (a) to (c) is satisfied.

(a) The total output of the at least one generator reaches a required value.

(b) All available steam or water is consumed.

(c) The state of the gas turbine plant reaches the operational limit of the gas turbine plant.

According to the gas turbine plant described in (10) above, it is possible to increase the power supply amount and the heat supply amount by maximally using steam or water in a range at which electricity demand is satisfied. Note that "the total output of the at least one generator" in the condition (a) refers to the output of one generator when the gas turbine plant includes only one generator, and refers to the total output of a plurality of generators when the gas turbine plant includes a plurality of generators.

(11) In some embodiments, the gas turbine plant described in (9) or (10) above further including:

a heat recovery steam generator (for example, the heat recovery steam generator 8 described above) configured to heat at least one of steam or water by using heat of exhaust gas of the turbine.

According to the gas turbine plant described in (11) above, thermal energy of exhaust gas of the turbine can be recovered by a heat recovery steam generator.

(12) In some embodiments, in the gas turbine plant described in (11) above, the plurality of supply lines are configured to supply at least one of steam or water heated by the heat recovery steam generator to the connection line.

According to the gas turbine plant described in (12) above, the output of the turbine can be increased by supplying steam and water heated by the heat recovery steam generator to the connection line.

(13) In some embodiments, in the gas turbine plant described in (12) above, at least one of the plurality of supply lines branches to supply steam or water heated by the heat recovery steam generator as a heat source to an outside, and the control device is configured to, when a heat demand of the outside is smaller than a reference level, control the plurality of adjustment devices to supply, to the connection line, steam or water having higher enthalpy than when the heat demand of the outside is greater than the reference level.

According to the gas turbine plant described in (13) above, when an external heat demand is smaller than a reference level, high enthalpy steam or water can be supplied to the connection line to increase the output of the turbine, and when the external heat demand is greater than the reference level, low enthalpy steam or water can be supplied to the connection line to make use of high enthalpy steam or water to satisfy the external heat demand. Therefore, the output of the turbine can be increased in a range in which the external heat demand is satisfied.

(14) In some embodiments, the gas turbine plant according to any one of (11) to (13) described above further including:

a steam turbine (for example, the high-pressure steam turbine 96 and the low-pressure steam turbine 98 described above) configured to be driven by steam generated by the heat recovery steam generator, the control device is configured to increase a total output of the output of the turbine and an output of the steam turbine, by increasing the supply amount of steam or water to be supplied to the connection line in order from steam or water having relatively higher enthalpy, among steam or water from the plurality of supply lines.

According to the gas turbine plant described in (14) above, in a combined cycle power generation plant, preferentially supplying steam or water having high enthalpy to the connection line makes it possible to increase the power supply amount and the heat supply amount while suppressing an increase in fuel consumption.

(15) In some embodiments, the gas turbine plant according to any one of (1) to (14) described above, further including:

a heat recovery steam generator (for example, the heat recovery steam generator 8 described above) configured to heat at least one of steam or water by using heat of exhaust gas of the turbine; and a feed water line (for example, the low-temperature feed water line 54 described above) configured to supply water to the heat recovery steam generator, in which the heat recovery steam generator includes a condensation economizer (for example, the condensation economizer 65 described above) configured to condense a part of steam contained in the exhaust gas of the turbine, and the gas turbine plant further includes a condensed water line configured to supply condensed water condensed by the condensation economizer to the feed water line or the connection line.

In the gas turbine plant described in (15) above, when at least one of steam or water is supplied to the connection line, the concentration of water vapor in the exhaust gas of the turbine is higher than that of a gas turbine plant in the related art. Thus, compared to a gas turbine plant in the related art, the dew point temperature of the water vapor in the exhaust gas increases, and water vapor is likely to be condensed.

Thus, as in the gas turbine plant described in (15) above, when a condensation economizer is provided and moisture in the exhaust gas is condensed, it is possible to significantly increase the amount of latent heat recovered from water vapor, compared to a case where a condensation economizer is provided in the gas turbine plant in the related art. Further, in the gas turbine plant described in (15) above, condensed water is recovered through the condensed water line and is supplied to the feed water line or the connection line, so that it is possible to suppress an increase in the consumption of water.

(16) In some embodiments, the gas turbine plant according to any one of (1) to (15) described above further including:

a heat recovery steam generator (for example, the heat recovery steam generator 8 described above) configured to heat at least one of steam or water by using heat of exhaust gas of the turbine;

a desalination device (for example, the desalination device 122 described above) configured to produce fresh water by using energy generated in the gas turbine plant;

a feed water line (for example, the low-temperature feed water line 54 described above) configured to supply water to the heat recovery steam generator; and a fresh water line (for example, the fresh water line 69 described above) configured to supply the fresh water produced by the desalination device to the feed water line or the connection line.

According to the gas turbine plant described in (16) above, the fresh water produced by using energy generated in the gas turbine plant is recovered through the fresh water line and is supplied to the feed water line or the connection line, so that it is possible to suppress an increase in the consumption of water.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A gas turbine plant comprising:
   a compressor including a compressor low-pressure stage for compressing air, and a compressor high-pressure stage for further compressing the air compressed at the compressor low-pressure stage;
   a combustor configured to mix and combust the air compressed by the compressor and fuel;
   a turbine configured to be driven by combustion gas generated in the combustor;
   a connection line configured to connect an outlet of the compressor high-pressure stage and an inlet of the turbine via the combustor;
   a bypass line configured to cause some or all of the air compressed at the compressor low-pressure stage to bypass the compressor high-pressure stage and to be supplied to the connection line;
   a first adjustment device configured to adjust a flow rate of the air flowing through the bypass line;
   a plurality of supply lines configured to supply a plurality of types of fluid, respectively, to the connection line in addition to the air compressed by the compressor;
   a plurality of second adjustment devices provided in the plurality of supply lines, respectively, and configured to adjust an amount of a corresponding one of the plurality of types of fluid to be supplied to the connection line; and
   a control device configured to control the first adjustment device and the plurality of second adjustment devices such that, during operation of the gas turbine plant, supply of at least one type of fluid of the plurality of types of fluid to the connection line is stopped according to an operating state of the gas turbine plant, and the bypass line is opened by the first adjustment device when the supply of the at least one type of fluid of the plurality of types of fluid to the connection line is stopped.

2. The gas turbine plant according to claim 1, further comprising:
a fuel supply device configured to supply at least two types of fuel having different calorific values to the combustor, wherein
the plurality of types of fluid include the at least two types of fuel.

3. The gas turbine plant according to claim 2,
the fuel supply device is configured to supply, to the combustor, a first fuel and a second fuel having a lower calorific value than the first fuel, as the two types of fuel, and
the control device is configured to open the bypass line by using the first adjustment device when the first fuel is supplied to the combustor by the fuel supply device, and close the bypass line by using the first adjustment device when the second fuel is supplied to the combustor by the fuel supply device.

4. The gas turbine plant according to claim 2,
the control device is configured to open the bypass line by using the first adjustment device when a calorific value of the fuel supplied to the combustor by the fuel supply device is higher than a threshold value, and close the bypass line by using the first adjustment device when the calorific value of the fuel supplied to the combustor by the fuel supply device is lower than the threshold value.

5. The gas turbine plant according to claim 1, further comprising:
a supply device configured to supply at least one of steam and water to the connection line, wherein
the plurality of types of fluid include at least one of steam and water.

6. The gas turbine plant according to claim 5,
the control device is configured to open the bypass line by using the first adjustment device when neither steam nor water is supplied to the connection line by the supply device, and close the bypass line by using the first adjustment device when at least one of steam and water is supplied to the connection line by the supply device.

7. The gas turbine plant according to claim 5,
the control device is configured to open or close the bypass line by using the first adjustment device, based on at least one of a supply amount of at least one of steam and water supplied to the connection line by the supply device, an output of the turbine, and a pressure at the outlet of the compressor high-pressure stage.

8. The gas turbine plant according to claim 1, further comprising:
a heat recovery steam generator configured to heat at least one of steam or water by using heat of exhaust gas of the turbine; and
a feed water line configured to supply water to the heat recovery steam generator, wherein
the heat recovery steam generator includes a condensation economizer configured to condense a part of steam contained in the exhaust gas of the turbine, and
the plurality of supply lines includes a condensed water line configured to supply condensed water condensed by the condensation economizer to the feed water line or the connection line.

9. The gas turbine plant according to claim 1, further comprising:
a heat recovery steam generator configured to heat at least one of steam or water by using heat of exhaust gas of the turbine;
a desalination device configured to produce fresh water by using energy generated in the gas turbine plant; and
a feed water line configured to supply water to the heat recovery steam generator,
wherein the plurality of supply lines includes a fresh water line configured to supply the fresh water produced by the desalination device to the feed water line or the connection line.

10. A gas turbine plant comprising:
a compressor;
a combustor configured to mix and combust air compressed by the compressor and fuel;
a turbine configured to be driven by combustion gas generated in the combustor;
a connection line configured to connect an outlet of the compressor and an inlet of the turbine via the combustor;
a plurality of supply lines configured to supply steam or water having different enthalpies to the connection line;
a plurality of adjustment devices provided in the plurality of supply lines, respectively, and configured to adjust an amount of steam or water to be supplied to the connection line;
at least one generator; and
a control device configured to control the plurality of adjustment devices, wherein
the control device is configured to increase an output of the turbine by controlling the plurality of adjustment devices to increase a supply amount of steam or water to be supplied to the connection line in order from steam or water having relatively higher enthalpy, among steam or water in the plurality of supply lines, and
the control device is configured to increase the supply amount of steam or water supplied to the connection line from the plurality of supply lines until any one of the following conditions (a) to (c) is satisfied:
(a) a total output of the at least one generator reaches a required value;
(b) all available steam or water is consumed; and
(c) a state of the gas turbine plant reaches the operational limit of the gas turbine plant.

11. The gas turbine plant according to claim 10, further comprising:
a heat recovery steam generator configured to heat at least one of steam or water by using heat of exhaust gas of the turbine.

12. The gas turbine plant according to claim 11, wherein the plurality of supply lines are configured to supply at least one of steam or water heated by the heat recovery steam generator to the connection line.

13. The gas turbine plant according to claim 12, wherein
at least one of the plurality of supply lines branches to supply steam or water heated by the heat recovery steam generator as a heat source to the outside, and
the control device is configured to, when a heat demand of the outside is smaller than a reference level, control the plurality of adjustment devices to supply, to the connection line, steam or water with higher enthalpy than when the heat demand of the outside is greater than the reference level.

14. The gas turbine plant according to claim 11, further comprising:
a steam turbine configured to be driven by steam generated by the heat recovery steam generator,
the control device is configured to increase a total output of the output of the turbine and an output of the steam turbine, by increasing the supply amount of steam or water to be supplied to the connection line in order from steam or water having relatively higher enthalpy, among steam or water from the plurality of supply lines.

15. The gas turbine plant according to claim 10, further comprising:
a heat recovery steam generator configured to heat at least one of steam or water by using heat of exhaust gas of the turbine; and
a feed water line configured to supply water to the heat recovery steam generator, wherein
the heat recovery steam generator includes a condensation economizer configured to condense a part of steam contained in the exhaust gas of the turbine, and
plurality of supply lines includes a condensed water line configured to supply condensed water condensed by the condensation economizer to the feed water line or the connection line.

16. The gas turbine plant according to claim 10, further comprising:
a heat recovery steam generator configured to heat at least one of steam or water by using heat of exhaust gas of the turbine;
a desalination device configured to produce fresh water by using energy generated in the gas turbine plant; and
a feed water line configured to supply water to the heat recovery steam generator,
wherein the plurality of supply lines includes a fresh water line configured to supply the fresh water produced by the desalination device to the feed water line or the connection line.

17. A gas turbine plant comprising:
a compressor including a compressor low-pressure stage for compressing air, and a compressor high-pressure stage for further compressing the air compressed at the compressor low-pressure stage;
a combustor configured to mix and combust the air compressed by the compressor and fuel;
a turbine configured to be driven by combustion gas generated in the combustor;
a connection line configured to connect an outlet of the compressor high-pressure stage and an inlet of the turbine via the combustor;
a bypass line configured to cause some or all of the air compressed at the compressor low-pressure stage to bypass the compressor high-pressure stage and to be supplied to the connection line;
a first adjustment device configured to adjust a flow rate of the air flowing through the bypass line;
a plurality of supply lines configured to supply a plurality of types of fluid, respectively, to the connection line in addition to the air compressed by the compressor;
a plurality of second adjustment devices provided in the plurality of supply lines, respectively, and configured to adjust an amount of a corresponding one of the plurality of types of fluid to be supplied to the connection line;
a fuel supply device configured to supply at least two types of fuel having different calorific values to the combustor, the plurality of types of fluid including the at least two types of fuel; and
a control device configured to control the first adjustment device and the plurality of second adjustment devices such that, during operation of the gas turbine plant, supply of at least one type of fluid of the plurality of types of fluid to the connection line is stopped according to an operating state of the gas turbine plant,
wherein the control device is further configured to open the bypass line by using the first adjustment device when a calorific value of the fuel supplied to the combustor by the fuel supply device is higher than a threshold value, and close the bypass line by using the first adjustment device when the calorific value of the fuel supplied to the combustor by the fuel supply device is lower than the threshold value.

* * * * *